US012465447B2

(12) United States Patent
Lech

(10) Patent No.: US 12,465,447 B2
(45) Date of Patent: Nov. 11, 2025

(54) SURGICAL ROBOTIC SYSTEM WITH INSTRUMENT DETECTION

(71) Applicant: Covidien LP, Mansfield, MA (US)

(72) Inventor: Richard S. Lech, Hamden, CT (US)

(73) Assignee: Covidien LP, Mansfield, MA (US)

( * ) Notice: Subject to any disclaimer, the term of this patent is extended or adjusted under 35 U.S.C. 154(b) by 288 days.

(21) Appl. No.: 18/230,843

(22) Filed: Aug. 7, 2023

(65) Prior Publication Data
US 2024/0065787 A1 Feb. 29, 2024

Related U.S. Application Data

(60) Provisional application No. 63/400,829, filed on Aug. 25, 2022.

(51) Int. Cl.
*A61B 34/37* (2016.01)
*A61B 17/00* (2006.01)
*A61B 34/30* (2016.01)

(52) U.S. Cl.
CPC ........ *A61B 34/37* (2016.02); *A61B 17/00234* (2013.01); *A61B 2017/00353* (2013.01); *A61B 2017/00477* (2013.01); *A61B 2034/305* (2016.02)

(58) Field of Classification Search
CPC ........ A61B 17/00234; A61B 17/07207; A61B 2017/00353; A61B 2017/00398; A61B 2017/00477; A61B 2034/305; A61B 2090/0808; A61B 34/30; A61B 34/37
See application file for complete search history.

(56) References Cited

U.S. PATENT DOCUMENTS

| | | | |
|---|---|---|---|
| 6,132,368 A | 10/2000 | Cooper | |
| 6,206,903 B1 | 3/2001 | Ramans | |
| 6,246,200 B1 | 6/2001 | Blumenkranz et al. | |
| 6,312,435 B1 | 11/2001 | Wallace et al. | |
| 6,331,181 B1 | 12/2001 | Tierney et al. | |
| 6,394,998 B1 | 5/2002 | Wallace et al. | |
| 6,424,885 B1 | 7/2002 | Niemeyer et al. | |
| 6,441,577 B2 | 8/2002 | Blumenkranz et al. | |
| 6,459,926 B1 | 10/2002 | Nowlin et al. | |
| 6,491,691 B1 | 12/2002 | Morley et al. | |
| 6,491,701 B2 * | 12/2002 | Tierney .................. A61B 46/13 606/130 |
| 6,493,608 B1 | 12/2002 | Niemeyer | |
| 6,565,554 B1 | 5/2003 | Niemeyer | |
| 6,645,196 B1 | 11/2003 | Nixon et al. | |
| 6,659,939 B2 | 12/2003 | Moll | |
| 6,671,581 B2 | 12/2003 | Niemeyer et al. | |
| 6,676,684 B1 | 1/2004 | Morley et al. | |

(Continued)

*Primary Examiner* — Mohamed G Gabr
(74) *Attorney, Agent, or Firm* — Carter, DeLuca & Farrell LLP

(57) ABSTRACT

A powered surgical system includes an instrument drive unit and an instrument configured to couple to the instrument drive unit. The system also includes a detection circuit configured to supply input signal to the instrument and to output one of a first value indicating a connection of the instrument or a second value indicating a disconnection of the instrument in an asymmetric-in-time hysteresis manner. The connection of the instrument is detected within a first interval and the disconnection of the instrument is detected after expiration of a second interval that is longer than the first interval.

20 Claims, 13 Drawing Sheets

(56) References Cited

U.S. PATENT DOCUMENTS

| | | |
|---|---|---|
| 6,685,698 B2 | 2/2004 | Morley et al. |
| 6,699,235 B2 | 3/2004 | Wallace et al. |
| 6,714,839 B2 | 3/2004 | Salisbury, Jr. et al. |
| 6,716,233 B1 | 4/2004 | Whitman |
| 6,728,599 B2 | 4/2004 | Wang et al. |
| 6,746,443 B1 | 6/2004 | Morley et al. |
| 6,766,204 B2 | 7/2004 | Niemeyer et al. |
| 6,770,081 B1 | 8/2004 | Cooper et al. |
| 6,772,053 B2 | 8/2004 | Niemeyer |
| 6,783,524 B2 | 8/2004 | Anderson et al. |
| 6,793,652 B1 | 9/2004 | Whitman et al. |
| 6,793,653 B2 | 9/2004 | Sanchez et al. |
| 6,799,065 B1 | 9/2004 | Niemeyer |
| 6,837,883 B2 | 1/2005 | Moll et al. |
| 6,839,612 B2 | 1/2005 | Sanchez et al. |
| 6,840,938 B1 | 1/2005 | Morley et al. |
| 6,843,403 B2 | 1/2005 | Whitman |
| 6,846,309 B2 | 1/2005 | Whitman et al. |
| 6,866,671 B2 | 3/2005 | Tierney et al. |
| 6,871,117 B2 | 3/2005 | Wang et al. |
| 6,879,880 B2 | 4/2005 | Nowlin et al. |
| 6,899,705 B2 | 5/2005 | Niemeyer |
| 6,902,560 B1 | 6/2005 | Morley et al. |
| 6,936,042 B2 | 8/2005 | Wallace et al. |
| 6,951,535 B2 | 10/2005 | Ghodoussi et al. |
| 6,974,449 B2 | 12/2005 | Niemeyer |
| 6,991,627 B2 | 1/2006 | Madhani et al. |
| 6,994,708 B2 | 2/2006 | Manzo |
| 7,048,745 B2 | 5/2006 | Tierney et al. |
| 7,066,926 B2 | 6/2006 | Wallace et al. |
| 7,118,582 B1 | 10/2006 | Wang et al. |
| 7,125,403 B2 | 10/2006 | Julian et al. |
| 7,155,315 B2 | 12/2006 | Niemeyer et al. |
| 7,239,940 B2 | 7/2007 | Wang et al. |
| 7,306,597 B2 | 12/2007 | Manzo |
| 7,357,774 B2 | 4/2008 | Cooper |
| 7,373,219 B2 | 5/2008 | Nowlin et al. |
| 7,379,790 B2 | 5/2008 | Toth et al. |
| 7,386,365 B2 | 6/2008 | Nixon |
| 7,391,173 B2 | 6/2008 | Schena |
| 7,398,707 B2 | 7/2008 | Morley et al. |
| 7,413,565 B2 | 8/2008 | Wang et al. |
| 7,453,227 B2 | 11/2008 | Prisco et al. |
| 7,524,320 B2 | 4/2009 | Tierney et al. |
| 7,574,250 B2 | 8/2009 | Niemeyer |
| 7,594,912 B2 | 9/2009 | Cooper et al. |
| 7,607,440 B2 | 10/2009 | Coste-Maniere et al. |
| 7,666,191 B2 | 2/2010 | Orban et al. |
| 7,682,357 B2 | 3/2010 | Ghodoussi et al. |
| 7,689,320 B2 | 3/2010 | Prisco et al. |
| 7,695,481 B2 | 4/2010 | Wang et al. |
| 7,695,485 B2 | 4/2010 | Whitman et al. |
| 7,699,855 B2 | 4/2010 | Anderson et al. |
| 7,713,263 B2 | 5/2010 | Niemeyer |
| 7,725,214 B2 | 5/2010 | Diolaiti |
| 7,727,244 B2 | 6/2010 | Orban, III et al. |
| 7,741,802 B2 | 6/2010 | Prisco |
| 7,756,036 B2 | 7/2010 | Druke et al. |
| 7,757,028 B2 | 7/2010 | Druke et al. |
| 7,762,825 B2 | 7/2010 | Burbank et al. |
| 7,778,733 B2 | 8/2010 | Nowlin et al. |
| 7,803,151 B2 | 9/2010 | Whitman |
| 7,806,891 B2 | 10/2010 | Nowlin et al. |
| 7,819,859 B2 | 10/2010 | Prisco et al. |
| 7,819,885 B2 | 10/2010 | Cooper |
| 7,824,401 B2 | 11/2010 | Manzo et al. |
| 7,835,823 B2 | 11/2010 | Sillman et al. |
| 7,843,158 B2 | 11/2010 | Prisco |
| 7,865,266 B2 | 1/2011 | Moll et al. |
| 7,865,269 B2 | 1/2011 | Prisco et al. |
| 7,886,743 B2 | 2/2011 | Cooper et al. |
| 7,899,578 B2 | 3/2011 | Prisco et al. |
| 7,907,166 B2 | 3/2011 | Lamprecht et al. |
| 7,935,130 B2 | 5/2011 | Williams |
| 7,963,913 B2 | 6/2011 | Devengenzo et al. |
| 7,983,793 B2 | 7/2011 | Toth et al. |
| 8,002,767 B2 | 8/2011 | Sanchez |
| 8,004,229 B2 | 8/2011 | Nowlin et al. |
| 8,012,170 B2 | 9/2011 | Whitman et al. |
| 8,054,752 B2 | 11/2011 | Druke et al. |
| 8,062,288 B2 | 11/2011 | Cooper et al. |
| 8,079,950 B2 | 12/2011 | Stern et al. |
| 8,100,133 B2 | 1/2012 | Mintz et al. |
| 8,108,072 B2 | 1/2012 | Zhao et al. |
| 8,120,301 B2 | 2/2012 | Goldberg et al. |
| 8,142,447 B2 | 3/2012 | Cooper et al. |
| 8,147,503 B2 | 4/2012 | Zhao et al. |
| 8,151,661 B2 | 4/2012 | Schena et al. |
| 8,155,479 B2 | 4/2012 | Hoffman et al. |
| 8,182,469 B2 | 5/2012 | Anderson et al. |
| 8,202,278 B2 | 6/2012 | Orban et al. |
| 8,206,406 B2 | 6/2012 | Orban, III |
| 8,210,413 B2 | 7/2012 | Whitman et al. |
| 8,216,250 B2 | 7/2012 | Orban et al. |
| 8,220,468 B2 | 7/2012 | Cooper et al. |
| 8,256,319 B2 | 9/2012 | Cooper et al. |
| 8,285,517 B2 | 10/2012 | Sillman et al. |
| 8,315,720 B2 | 11/2012 | Mohr et al. |
| 8,335,590 B2 | 12/2012 | Costa et al. |
| 8,347,757 B2 | 1/2013 | Duval |
| 8,374,723 B2 | 2/2013 | Zhao et al. |
| 8,418,073 B2 | 4/2013 | Mohr et al. |
| 8,419,717 B2 | 4/2013 | Diolaiti et al. |
| 8,423,182 B2 | 4/2013 | Robinson et al. |
| 8,452,447 B2 | 5/2013 | Nixon |
| 8,454,585 B2 | 6/2013 | Whitman |
| 8,499,992 B2 | 8/2013 | Whitman et al. |
| 8,508,173 B2 | 8/2013 | Goldberg et al. |
| 8,528,440 B2 | 9/2013 | Morley et al. |
| 8,529,582 B2 | 9/2013 | Devengenzo et al. |
| 8,540,748 B2 | 9/2013 | Murphy et al. |
| 8,551,116 B2 | 10/2013 | Julian et al. |
| 8,562,594 B2 | 10/2013 | Cooper et al. |
| 8,594,841 B2 | 11/2013 | Zhao et al. |
| 8,597,182 B2 | 12/2013 | Stein et al. |
| 8,597,280 B2 | 12/2013 | Cooper et al. |
| 8,600,551 B2 | 12/2013 | Itkowitz et al. |
| 8,608,773 B2 | 12/2013 | Tierney et al. |
| 8,620,473 B2 | 12/2013 | Diolaiti et al. |
| 8,624,537 B2 | 1/2014 | Nowlin et al. |
| 8,634,957 B2 | 1/2014 | Toth et al. |
| 8,638,056 B2 | 1/2014 | Goldberg et al. |
| 8,638,057 B2 | 1/2014 | Goldberg et al. |
| 8,644,988 B2 | 2/2014 | Prisco et al. |
| 8,666,544 B2 | 3/2014 | Moll et al. |
| 8,668,638 B2 | 3/2014 | Donhowe et al. |
| 8,746,252 B2 | 6/2014 | McGrogan et al. |
| 8,749,189 B2 | 6/2014 | Nowlin et al. |
| 8,749,190 B2 | 6/2014 | Nowlin et al. |
| 8,758,352 B2 | 6/2014 | Cooper et al. |
| 8,761,930 B2 | 6/2014 | Nixon |
| 8,768,516 B2 | 7/2014 | Diolaiti et al. |
| 8,786,241 B2 | 7/2014 | Nowlin et al. |
| 8,790,243 B2 | 7/2014 | Cooper et al. |
| 8,808,164 B2 | 8/2014 | Hoffman et al. |
| 8,816,628 B2 | 8/2014 | Nowlin et al. |
| 8,821,480 B2 | 9/2014 | Burbank |
| 8,823,308 B2 | 9/2014 | Nowlin et al. |
| 8,827,989 B2 | 9/2014 | Niemeyer |
| 8,838,270 B2 | 9/2014 | Druke et al. |
| 8,852,174 B2 | 10/2014 | Burbank |
| 8,858,547 B2 | 10/2014 | Brogna |
| 8,862,268 B2 | 10/2014 | Robinson et al. |
| 8,864,751 B2 | 10/2014 | Prisco et al. |
| 8,864,752 B2 | 10/2014 | Diolaiti et al. |
| 8,903,546 B2 | 12/2014 | Diolaiti et al. |
| 8,903,549 B2 | 12/2014 | Itkowitz et al. |
| 8,911,428 B2 | 12/2014 | Cooper et al. |
| 8,912,746 B2 | 12/2014 | Reid et al. |
| 8,944,070 B2 | 2/2015 | Guthart |
| 8,989,903 B2 | 3/2015 | Weir et al. |
| 9,002,518 B2 | 4/2015 | Manzo |
| 9,014,856 B2 | 4/2015 | Manzo et al. |
| 9,016,540 B2 | 4/2015 | Whitman et al. |

(56) References Cited

U.S. PATENT DOCUMENTS

| | | |
|---|---|---|
| 9,019,345 B2 | 4/2015 | O'Grady et al. |
| 9,043,027 B2 | 5/2015 | Durant et al. |
| 9,050,120 B2 | 6/2015 | Swarup et al. |
| 9,055,961 B2 | 6/2015 | Manzo et al. |
| 9,068,628 B2 | 6/2015 | Solomon et al. |
| 9,078,684 B2 | 7/2015 | Williams |
| 9,084,623 B2 | 7/2015 | Gomez et al. |
| 9,095,362 B2 | 8/2015 | Dachs et al. |
| 9,096,033 B2 | 8/2015 | Holop et al. |
| 9,101,381 B2 | 8/2015 | Burbank et al. |
| 9,113,877 B1 | 8/2015 | Whitman et al. |
| 9,138,284 B2 | 9/2015 | Krom et al. |
| 9,144,456 B2 | 9/2015 | Rosa et al. |
| 9,198,730 B2 | 12/2015 | Prisco et al. |
| 9,204,923 B2 | 12/2015 | Manzo et al. |
| 9,226,648 B2 | 1/2016 | Saadat et al. |
| 9,226,750 B2 | 1/2016 | Weir et al. |
| 9,226,761 B2 | 1/2016 | Burbank |
| 9,232,984 B2 | 1/2016 | Guthart et al. |
| 9,241,766 B2 | 1/2016 | Duque et al. |
| 9,241,767 B2 | 1/2016 | Prisco et al. |
| 9,241,769 B2 | 1/2016 | Larkin et al. |
| 9,259,275 B2 | 2/2016 | Burbank |
| 9,259,277 B2 | 2/2016 | Rogers et al. |
| 9,259,281 B2 | 2/2016 | Griffiths et al. |
| 9,259,282 B2 | 2/2016 | Azizian et al. |
| 9,261,172 B2 | 2/2016 | Solomon et al. |
| 9,265,567 B2 | 2/2016 | Orban, III et al. |
| 9,265,584 B2 | 2/2016 | Itkowitz et al. |
| 9,283,049 B2 | 3/2016 | Diolaiti et al. |
| 9,301,811 B2 | 4/2016 | Goldberg et al. |
| 9,314,307 B2 | 4/2016 | Richmond et al. |
| 9,317,651 B2 | 4/2016 | Nixon |
| 9,345,546 B2 | 5/2016 | Toth et al. |
| 9,393,017 B2 | 7/2016 | Flanagan et al. |
| 9,402,689 B2 | 8/2016 | Prisco et al. |
| 9,417,621 B2 | 8/2016 | Diolaiti |
| 9,424,303 B2 | 8/2016 | Hoffman et al. |
| 9,433,418 B2 | 9/2016 | Whitman et al. |
| 9,446,517 B2 | 9/2016 | Burns et al. |
| 9,452,020 B2 | 9/2016 | Griffiths et al. |
| 9,474,569 B2 | 10/2016 | Manzo et al. |
| 9,480,533 B2 | 11/2016 | Devengenzo et al. |
| 9,503,713 B2 | 11/2016 | Zhao et al. |
| 9,550,300 B2 | 1/2017 | Danitz et al. |
| 9,554,859 B2 | 1/2017 | Nowlin et al. |
| 9,566,124 B2 | 2/2017 | Prisco et al. |
| 9,579,164 B2 | 2/2017 | Itkowitz et al. |
| 9,585,641 B2 | 3/2017 | Cooper et al. |
| 9,615,883 B2 | 4/2017 | Schena et al. |
| 9,623,563 B2 | 4/2017 | Nixon |
| 9,623,902 B2 | 4/2017 | Griffiths et al. |
| 9,629,520 B2 | 4/2017 | Diolaiti |
| 9,662,177 B2 | 5/2017 | Weir et al. |
| 9,664,262 B2 | 5/2017 | Donlon et al. |
| 9,675,354 B2 | 6/2017 | Weir et al. |
| 9,687,312 B2 | 6/2017 | Dachs, II et al. |
| 9,700,334 B2 | 7/2017 | Hinman et al. |
| 9,718,190 B2 | 8/2017 | Larkin et al. |
| 9,730,719 B2 | 8/2017 | Brisson et al. |
| 9,737,199 B2 | 8/2017 | Pistor et al. |
| 9,795,446 B2 | 10/2017 | DiMaio et al. |
| 9,797,484 B2 | 10/2017 | Solomon et al. |
| 9,801,690 B2 | 10/2017 | Larkin et al. |
| 9,814,530 B2 | 11/2017 | Weir et al. |
| 9,814,536 B2 | 11/2017 | Goldberg et al. |
| 9,814,537 B2 | 11/2017 | Itkowitz et al. |
| 9,820,823 B2 | 11/2017 | Richmond et al. |
| 9,827,059 B2 | 11/2017 | Robinson et al. |
| 9,830,371 B2 | 11/2017 | Hoffman et al. |
| 9,839,481 B2 | 12/2017 | Blumenkranz et al. |
| 9,839,487 B2 | 12/2017 | Dachs, II |
| 9,850,994 B2 | 12/2017 | Schena |
| 9,855,102 B2 | 1/2018 | Blumenkranz |
| 9,855,107 B2 | 1/2018 | Labonville et al. |
| 9,872,737 B2 | 1/2018 | Nixon |
| 9,877,718 B2 | 1/2018 | Weir et al. |
| 9,883,920 B2 | 2/2018 | Blumenkranz |
| 9,888,974 B2 | 2/2018 | Niemeyer |
| 9,895,813 B2 | 2/2018 | Blumenkranz et al. |
| 9,901,408 B2 | 2/2018 | Larkin |
| 9,918,800 B2 | 3/2018 | Itkowitz et al. |
| 9,943,375 B2 | 4/2018 | Blumenkranz et al. |
| 9,948,852 B2 | 4/2018 | Lilagan et al. |
| 9,949,798 B2 | 4/2018 | Weir |
| 9,949,802 B2 | 4/2018 | Cooper |
| 9,952,107 B2 | 4/2018 | Blumenkranz et al. |
| 9,956,044 B2 | 5/2018 | Gomez et al. |
| 9,980,778 B2 | 5/2018 | Ohline et al. |
| 10,008,017 B2 | 6/2018 | Itkowitz et al. |
| 10,028,793 B2 | 7/2018 | Griffiths et al. |
| 10,033,308 B2 | 7/2018 | Chaghajerdi et al. |
| 10,034,719 B2 | 7/2018 | Richmond et al. |
| 10,052,167 B2 | 8/2018 | Au et al. |
| 10,085,811 B2 | 10/2018 | Weir et al. |
| 10,092,165 B2 | 10/2018 | Power |
| 10,092,344 B2 | 10/2018 | Mohr et al. |
| 10,123,844 B2 | 11/2018 | Nowlin |
| 10,188,471 B2 | 1/2019 | Brisson |
| 10,201,390 B2 | 2/2019 | Swarup et al. |
| 10,213,202 B2 | 2/2019 | Flanagan et al. |
| 10,258,416 B2 | 4/2019 | Mintz et al. |
| 10,278,782 B2 | 5/2019 | Jarc et al. |
| 10,278,783 B2 | 5/2019 | Itkowitz et al. |
| 10,282,881 B2 | 5/2019 | Itkowitz et al. |
| 10,335,242 B2 | 7/2019 | Devengenzo et al. |
| 10,405,934 B2 | 9/2019 | Prisco et al. |
| 10,433,922 B2 | 10/2019 | Itkowitz et al. |
| 10,464,219 B2 | 11/2019 | Robinson et al. |
| 10,485,621 B2 | 11/2019 | Morrissette et al. |
| 10,500,004 B2 | 12/2019 | Hanuschik et al. |
| 10,500,005 B2 | 12/2019 | Weir et al. |
| 10,500,007 B2 | 12/2019 | Richmond et al. |
| 10,507,066 B2 | 12/2019 | DiMaio et al. |
| 10,510,267 B2 | 12/2019 | Jarc et al. |
| 10,524,871 B2 | 1/2020 | Liao |
| 10,548,459 B2 | 2/2020 | Itkowitz et al. |
| 10,575,909 B2 | 3/2020 | Robinson et al. |
| 10,592,529 B2 | 3/2020 | Hoffman et al. |
| 10,595,946 B2 | 3/2020 | Nixon |
| 10,881,469 B2 | 1/2021 | Robinson |
| 10,881,473 B2 | 1/2021 | Itkowitz et al. |
| 10,898,188 B2 | 1/2021 | Burbank |
| 10,898,189 B2 | 1/2021 | McDonald |
| 10,905,506 B2 | 2/2021 | Itkowitz et al. |
| 10,912,544 B2 | 2/2021 | Brisson et al. |
| 10,912,619 B2 | 2/2021 | Jarc et al. |
| 10,918,387 B2 | 2/2021 | Duque et al. |
| 10,918,449 B2 | 2/2021 | Solomon et al. |
| 10,932,873 B2 | 3/2021 | Griffiths et al. |
| 10,932,877 B2 | 3/2021 | Devengenzo et al. |
| 10,939,969 B2 | 3/2021 | Swarup et al. |
| 10,939,973 B2 | 3/2021 | DiMaio et al. |
| 10,952,801 B2 | 3/2021 | Miller et al. |
| 10,965,933 B2 | 3/2021 | Jarc |
| 10,966,742 B2 | 4/2021 | Rosa et al. |
| 10,973,517 B2 | 4/2021 | Wixey |
| 10,973,519 B2 | 4/2021 | Weir et al. |
| 10,984,567 B2 | 4/2021 | Itkowitz et al. |
| 10,993,773 B2 | 5/2021 | Cooper et al. |
| 10,993,775 B2 | 5/2021 | Cooper et al. |
| 11,000,331 B2 | 5/2021 | Krom et al. |
| 11,013,567 B2 | 5/2021 | Wu et al. |
| 11,020,138 B2 | 6/2021 | Ragosta |
| 11,020,191 B2 | 6/2021 | Diolaiti et al. |
| 11,020,193 B2 | 6/2021 | Wixey et al. |
| 11,026,755 B2 | 6/2021 | Weir et al. |
| 11,026,759 B2 | 6/2021 | Donlon et al. |
| 11,040,189 B2 | 6/2021 | Vaders et al. |
| 11,045,077 B2 | 6/2021 | Stern et al. |
| 11,045,274 B2 | 6/2021 | Dachs, II et al. |
| 11,058,501 B2 | 7/2021 | Tokarchuk et al. |
| 11,076,925 B2 | 8/2021 | DiMaio et al. |
| 11,090,119 B2 | 8/2021 | Burbank |

(56) References Cited

U.S. PATENT DOCUMENTS

| | | |
|---|---|---|
| 11,096,687 B2 | 8/2021 | Flanagan et al. |
| 11,098,803 B2 | 8/2021 | Duque et al. |
| 11,109,925 B2 | 9/2021 | Cooper et al. |
| 11,116,578 B2 | 9/2021 | Hoffman et al. |
| 11,129,683 B2 | 9/2021 | Steger et al. |
| 11,135,029 B2 | 10/2021 | Suresh et al. |
| 11,147,552 B2 | 10/2021 | Burbank et al. |
| 11,147,640 B2 | 10/2021 | Jarc et al. |
| 11,154,373 B2 | 10/2021 | Abbott et al. |
| 11,154,374 B2 | 10/2021 | Hanuschik et al. |
| 11,160,622 B2 | 11/2021 | Goldberg et al. |
| 11,160,625 B2 | 11/2021 | Wixey et al. |
| 11,161,243 B2 | 11/2021 | Rabindran et al. |
| 11,166,758 B2 | 11/2021 | Mohr et al. |
| 11,166,770 B2 | 11/2021 | DiMaio et al. |
| 11,166,773 B2 | 11/2021 | Ragosta et al. |
| 11,173,597 B2 | 11/2021 | Rabindran et al. |
| 11,185,378 B2 | 11/2021 | Weir et al. |
| 11,191,596 B2 | 12/2021 | Thompson et al. |
| 11,197,729 B2 | 12/2021 | Thompson et al. |
| 11,213,360 B2 | 1/2022 | Hourtash et al. |
| 11,221,863 B2 | 1/2022 | Azizian et al. |
| 11,234,700 B2 | 2/2022 | Ragosta et al. |
| 11,241,274 B2 | 2/2022 | Vaders et al. |
| 11,241,290 B2 | 2/2022 | Waterbury et al. |
| 11,259,870 B2 | 3/2022 | DiMaio et al. |
| 11,259,884 B2 | 3/2022 | Burbank |
| 11,272,993 B2 | 3/2022 | Gomez et al. |
| 11,272,994 B2 | 3/2022 | Saraliev et al. |
| 11,291,442 B2 | 4/2022 | Wixey et al. |
| 11,291,513 B2 | 4/2022 | Manzo et al. |
| 11,376,002 B2 | 7/2022 | Shelton, IV et al. |
| 11,376,098 B2 | 7/2022 | Shelton, IV et al. |
| 11,381,759 B2 | 7/2022 | Zhao et al. |
| 11,382,621 B2 | 7/2022 | Scheib et al. |
| 11,382,624 B2 | 7/2022 | Harris et al. |
| 11,382,625 B2 | 7/2022 | Huitema et al. |
| 11,382,626 B2 | 7/2022 | Shelton, IV et al. |
| 11,382,627 B2 | 7/2022 | Huitema et al. |
| 11,382,638 B2 | 7/2022 | Harris et al. |
| 11,382,644 B2 | 7/2022 | Schoettgen et al. |
| 11,389,160 B2 | 7/2022 | Shelton, IV et al. |
| 11,389,255 B2 | 7/2022 | DiMaio et al. |
| 11,399,906 B2 | 8/2022 | Shelton, IV et al. |
| 11,406,379 B2 | 8/2022 | Hess et al. |
| 11,410,259 B2 | 8/2022 | Harris et al. |
| 11,419,630 B2 | 8/2022 | Yates et al. |
| 11,424,027 B2 | 8/2022 | Shelton, IV |
| 11,432,888 B2 | 9/2022 | Diolaiti et al. |
| 11,432,893 B2 | 9/2022 | Itkowitz et al. |
| 11,432,895 B2 | 9/2022 | Loh et al. |
| 11,439,390 B2 | 9/2022 | Patel et al. |
| 11,439,391 B2 | 9/2022 | Bruns et al. |
| 11,468,791 B2 | 10/2022 | Jarc et al. |
| 11,471,155 B2 | 10/2022 | Shelton, IV et al. |
| 11,471,221 B2 | 10/2022 | Zhao et al. |
| 11,478,308 B2 | 10/2022 | Hoffman et al. |
| 11,490,977 B2 | 11/2022 | Schena et al. |
| 11,497,499 B2 | 11/2022 | Shelton, IV et al. |
| 11,504,119 B2 | 11/2022 | Shelton, IV et al. |
| 11,504,124 B2 | 11/2022 | Patel et al. |
| 11,510,743 B2 | 11/2022 | Shelton, IV et al. |
| 11,517,312 B2 | 12/2022 | Wixey |
| 11,517,325 B2 | 12/2022 | Shelton, IV et al. |
| 11,518,048 B2 | 12/2022 | Saraliev et al. |
| 2011/0208206 A1* | 8/2011 | Diamant ............ A61B 17/2202 606/128 |
| 2020/0345388 A1* | 11/2020 | Downey ................ A61B 90/98 |
| 2020/0405406 A1 | 12/2020 | Harris et al. |

\* cited by examiner

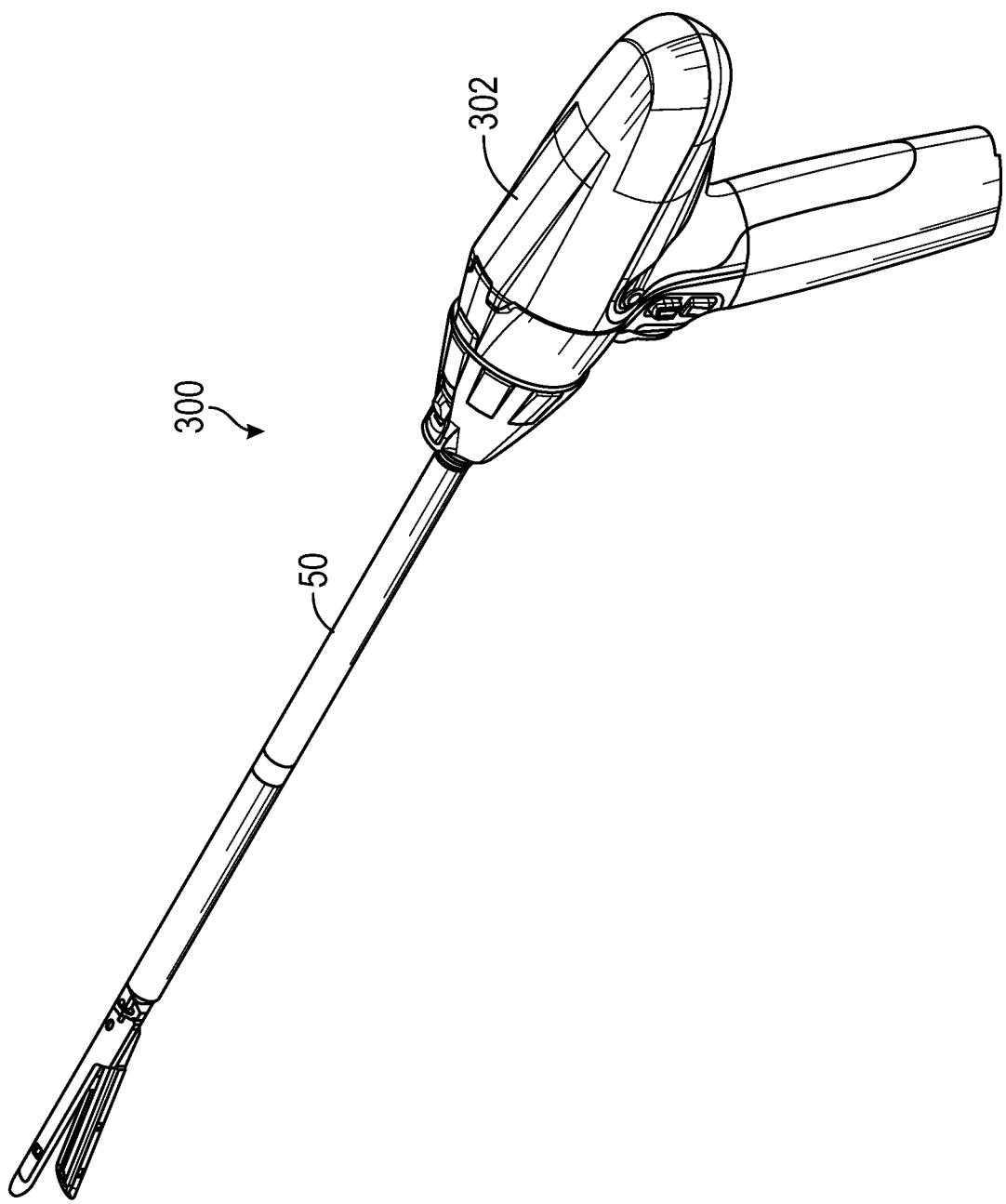

SURGICAL ROBOTIC SYSTEM WITH INSTRUMENT DETECTION

CROSS-REFERENCE TO RELATED APPLICATIONS

This application claims the benefit of the filing date of provisional U.S. Patent Application No. 63/400,829 filed on Aug. 25, 2022. The entire disclosure of the foregoing application is incorporated by reference herein.

BACKGROUND

Surgical robotic systems are currently being used in minimally invasive medical procedures. Some surgical robotic systems include a surgeon console controlling a surgical robotic arm and a surgical instrument having an end effector (e.g., forceps or grasping instrument) coupled to and actuated by the robotic arm. In operation, the robotic arm is moved to a position over a patient and then guides the surgical instrument into a small incision via a surgical port or a natural orifice of a patient to position the end effector at a work site within the patient's body.

During use, it would be useful for the system to monitor the status of the connection of the instrument with the robotic arm to determine if the surgical instrument has been disconnected from the robotic arm. However, detection of an intermittent connection of can result in interruption of normal operation of the instrument. Thus, there is a need for detection of the surgical instrument or end effector to prevent interruption of normal operation of the instrument while rejecting false disconnections caused by external sources, such as intermittent electromechanical connections or external electromagnetic noise.

SUMMARY

The present disclosure provides systems and methods for detecting the connection status of a surgical instrument or end effector with a robotic arm. The detection system according to the present disclosure incorporates an asymmetric-in-time hysteresis monitoring which enables quick detection of an instrument connection while rejecting quick disconnections.

As used herein, hysteresis denotes to variation along a time axis, rather than amplitude of a signal, unless otherwise specified. In other words, the output transition from inactive to active tracks the input as close as possible to minimize delay or set delay to one that is different (lower) than the transition from active to inactive. The output transition from active to inactive can be set to one significantly greater than the inactive to active state. This allows the rejection of transitions that are too short to be of consideration. In addition, the hysteresis may be implemented in a reverse manner, where the input is valid longer before an inactive-to-active transition is made and the active-to-inactive response time is shorter than the input. These are different than just filtering the input to output response because a filter would create the same phase delay in transitions from inactive to active and vice-versa.

According to one embodiment of the present disclosure, a powered surgical system is disclosed. The powered surgical system includes an instrument drive unit and an instrument configured to couple to the instrument drive unit. The system also includes a detection circuit configured to supply an input signal to the instrument and to output an output signal having a first value indicating a connection of the instrument and a second value indicating a disconnection of the instrument in an asymmetric-in-time hysteresis manner. The connection of the instrument is detected within a first interval and the disconnection of the instrument is detected after expiration of a second interval that is longer than the first interval.

Implementations of the above embodiment may include one or more of the following features. According to one aspect of the above embodiment, the powered surgical system may include a processor configured to determine a connection status of the instrument based on receipt of the output signal. The processor may be configured to output the connection status on a display. The detection circuit may include an electrical connection configured to couple to the instrument, and a follower amplifier coupled to the electrical connection and configured to buffer an instrument signal received from the connection. The detection circuit further may include: a charge shutdown amplifier coupled to the follower amplifier, where the charge shutdown amplifier is configured to supply an activation signal to the follower amplifier in response to the instrument signal being positive, where the activation signal enables the follower amplifier. The charge shutdown amplifier may further be configured to supply a shutdown signal to the follower amplifier in response to the instrument signal being zero, where the shutdown signal disables the follower amplifier. The detection circuit further may include: a charge tank including: a resistor divider having first resistor having a first resistance, a second resistor having a second resistance larger than the first resistance; and a tank capacitor, where the charge tank is configured to output a charge signal based on a charge of the tank capacitor. The tank capacitor may be configured to charge during a charging interval when the follower amplifier is enabled and to discharge during a discharging interval when the follower amplifier is disabled. The discharging interval corresponds to the second interval and may be longer than the charging interval, which may correspond to the first interval. The detection circuit further may include: a comparator coupled to the charge tank, the comparator configured to output the output signal based on a comparison of a charged signal to a reference signal. The powered surgical system may include: a robotic arm that may include the instrument drive unit. The instrument drive unit may be a powered surgical handle.

According to another embodiment of the present disclosure, an instrument connection detection circuit is disclosed. The instrument connection detection circuit includes an electrical connection configured to couple to an instrument coupled to an instrument drive unit, and an input signal source configured to supply an input signal to the instrument. The instrument connection detection circuit also includes a comparator to output one of a first value indicating a connection of the instrument or a second value indicating a disconnection of the instrument in an asymmetric-in-time hysteresis manner. The connection of the instrument is detected within a first interval and the disconnection of the instrument is detected after expiration of a second interval that is longer than the first interval.

Implementations of the above embodiment may include one or more of the following features. According to one aspect of the above embodiment, the instrument connection detection circuit may include a follower amplifier coupled to the electrical connection and configured to buffer an instrument signal received from the connection. A charge shutdown amplifier may be configured to supply an activation signal to the follower amplifier in response to the instrument signal being positive, where the activation signal enables the follower amplifier. The charge shutdown amplifier may further be configured to supply a shutdown signal to the follower amplifier in response to the instrument signal being zero, where the shutdown signal disables the follower amplifier. A charge tank may be configured to output a charge signal based on a charge of the tank capacitor. The tank capacitor may be configured to charge during a charging interval when the follower amplifier is enabled and to discharge during a discharging interval when the follower amplifier is disabled. The discharging interval may correspond to the second interval and may be longer than the charging interval which may correspond to the first interval.

According to a further embodiment of the present disclosure, a method for determining a connection status of an instrument is disclosed. The method includes supplying an input signal from a detection circuit to an instrument coupled to an instrument drive unit. The method further includes outputting an output signal having one of a first value indicating a connection of the instrument or a second value indicating a disconnection of the instrument in an asymmetric-in-time hysteresis manner. The connection of the instrument is detected within a first interval and the disconnection of the instrument is detected after expiration of a second interval that is longer than the first interval. The method further includes providing one of the first value or the second value to a processor. The method additionally includes outputting a connection status message based on receipt of the output signal.

Implementations of the above embodiment may include one or more of the following features. According to one aspect of the above embodiment, the instrument drive unit may be coupled to a robotic arm or may be a powered surgical handheld instrument.

BRIEF DESCRIPTION OF THE DRAWINGS

Various embodiments of the present disclosure are described herein with reference to the drawings wherein:

FIG. 13 is a perspective view of a powered surgical stapler according to an embodiment of the present disclosure.

DETAILED DESCRIPTION

Figure 1:
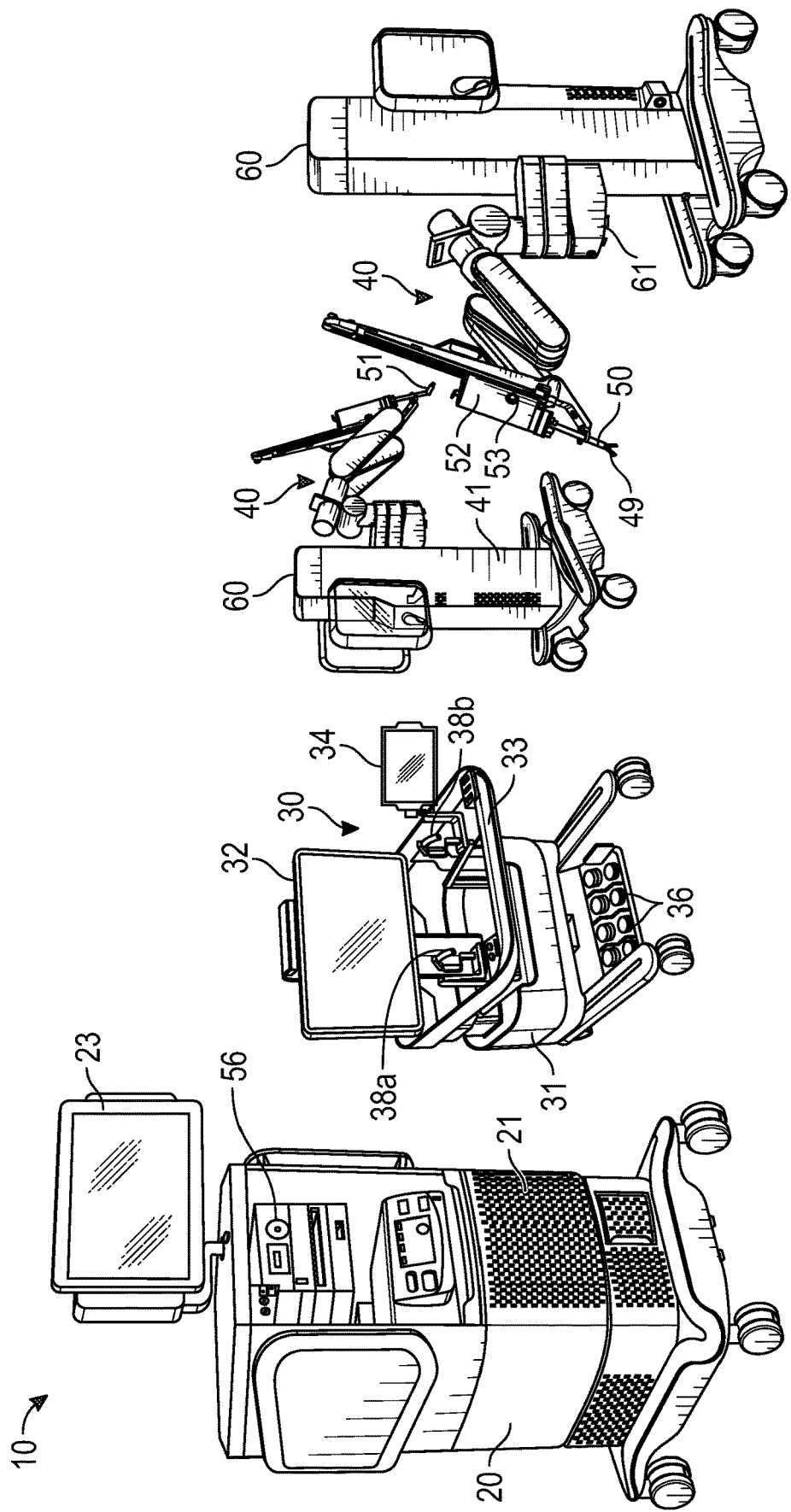
FIG. 1 is a schematic illustration of a surgical robotic system including a control tower, a console, and one or more surgical robotic arms each disposed on a movable cart according to an embodiment of the present disclosure.

Embodiments of the presently disclosed surgical robotic system are described in detail with reference to the drawings, in which like reference numerals designate identical or corresponding elements in each of the several views.

As will be described in detail below, the present disclosure is directed to a surgical robotic system, which includes a surgeon console, a control tower, and one or more movable carts having a surgical robotic arm coupled to a setup arm. The surgeon console receives user input through one or more interface devices, which are processed by the control tower as movement commands for moving the surgical robotic arm and an instrument and/or camera coupled thereto. Thus, the surgeon console enables teleoperation of the surgical arms and attached instruments/camera. The surgical robotic arm includes a controller, which is configured to process the movement command and to generate a torque command for activating one or more actuators of the robotic arm, which would, in turn, move the robotic arm in response to the movement command.

With reference to FIG. 1, a surgical robotic system 10 includes a control tower 20, which is connected to all of the components of the surgical robotic system 10 including a surgeon console 30 and one or more movable carts 60. Each of the movable carts 60 includes a robotic arm 40 having a surgical instrument 50 removably coupled thereto. The robotic arms 40 also couple to the movable carts 60. The robotic system 10 may include any number of movable carts 60 and/or robotic arms 40.

The instrument 50 is mechanically and electrically coupled to the instrument drive unit (IDU) 52. In particular, one or more motors of the IDU 52 are coupled to drive shafts or other linkages of the instrument 50 and configured to actuate the end effector 49 (e.g., open, pivot, rotate, etc. the end effector 49). The instrument 50 also includes a plurality of electrical contacts to enable transmission of communication and/or electrical power signals between the instrument 50 and the IDU 52, and thereby the system 10.

The surgical instrument 50 is configured for use during minimally invasive surgical procedures. In embodiments, the surgical instrument 50 may be configured for open surgical procedures. In further embodiments, the surgical instrument 50 may be an electrosurgical forceps configured to seal tissue by compressing tissue between jaw members and applying electrosurgical current thereto. In yet further embodiments, the surgical instrument 50 may be a surgical stapler including a pair of jaws configured to grasp and clamp tissue while deploying a plurality of tissue fasteners, e.g., staples, and cutting stapled tissue. In yet further embodiments, the surgical instrument 50 may be a surgical clip applier including a pair of jaws configured apply a surgical clip onto tissue.

One of the robotic arms 40 may include an endoscopic camera 51 configured to capture video of the surgical site. The endoscopic camera 51 may be a stereoscopic endoscope configured to capture two side-by-side (i.e., left and right) images of the surgical site to produce a video stream of the surgical scene. The endoscopic camera 51 is coupled to a video processing device 56, which may be disposed within the control tower 20. The video processing device 56 may be any computing device as described below configured to receive the video feed from the endoscopic camera 51 and output the processed video stream.

The surgeon console 30 includes a first display 32, which displays a video feed of the surgical site provided by camera 51 of the surgical instrument 50 disposed on the robotic arm 40, and a second display 34, which displays a user interface for controlling the surgical robotic system 10. The first display 32 and second display 34 may be touchscreens allowing for displaying various graphical user inputs.

The surgeon console 30 also includes a plurality of user interface devices, such as foot pedals 36 and a pair of handle controllers 38a and 38b which are used by a user to remotely control robotic arms 40. The surgeon console further includes an armrest 33 used to support clinician's arms while operating the handle controllers 38a and 38b.

The control tower 20 includes a display 23, which may be a touchscreen, and outputs on the graphical user interfaces (GUIs). The control tower 20 also acts as an interface between the surgeon console 30 and one or more robotic arms 40. In particular, the control tower 20 is configured to control the robotic arms 40, such as to move the robotic arms 40 and the corresponding surgical instrument 50, based on a set of programmable instructions and/or input commands from the surgeon console 30, in such a way that robotic arms 40 and the surgical instrument 50 execute a desired movement sequence in response to input from the foot pedals 36 and the handle controllers 38a and 38b. The foot pedals 36 may be used to enable and lock the hand controllers 38a and 38b, repositioning camera movement and electrosurgical activation/deactivation. In particular, the foot pedals 36 may be used to perform a clutching action on the hand controllers 38a and 38b. Clutching is initiated by pressing one of the foot pedals 36, which disconnects (i.e., prevents movement inputs) the hand controllers 38a and/or 38b from the robotic arm 40 and corresponding instrument 50 or camera 51 attached thereto. This allows the user to reposition the hand controllers 38a and 38b without moving the robotic arm(s) 40 and the instrument 50 and/or camera 51. This is useful when reaching control boundaries of the surgical space.

Each of the control tower 20, the surgeon console 30, and the robotic arm 40 includes a respective computer 21, 31, 41. The computers 21, 31, 41 are interconnected to each other using any suitable communication network based on wired or wireless communication protocols. The term "network," whether plural or singular, as used herein, denotes a data network, including, but not limited to, the Internet, Intranet, a wide area network, or a local area network, and without limitation as to the full scope of the definition of communication networks as encompassed by the present disclosure. Suitable protocols include, but are not limited to, transmission control protocol/internet protocol (TCP/IP), datagram protocol/internet protocol (UDP/IP), and/or datagram congestion control protocol (DCCP). Wireless communication may be achieved via one or more wireless configurations, e.g., radio frequency, optical, Wi-Fi, Bluetooth (an open wireless protocol for exchanging data over short distances, using short length radio waves, from fixed and mobile devices, creating personal area networks (PANs), ZigBee® (a specification for a suite of high level communication protocols using small, low-power digital radios based on the IEEE 122.15.4-1203 standard for wireless personal area networks (WPANs)).

The computers 21, 31, 41 may include any suitable processor (not shown) operably connected to a memory (not shown), which may include one or more of volatile, non-volatile, magnetic, optical, or electrical media, such as read-only memory (ROM), random access memory (RAM), electrically-erasable programmable ROM (EEPROM), non-volatile RAM (NVRAM), or flash memory. The processor may be any suitable processor (e.g., control circuit) adapted to perform the operations, calculations, and/or set of instructions described in the present disclosure including, but not limited to, a hardware processor, a field programmable gate array (FPGA), a digital signal processor (DSP), a central processing unit (CPU), a microprocessor, and combinations thereof. Those skilled in the art will appreciate that the processor may be substituted for by using any logic processor (e.g., control circuit) adapted to execute algorithms, calculations, and/or set of instructions described herein.

Figure 2:
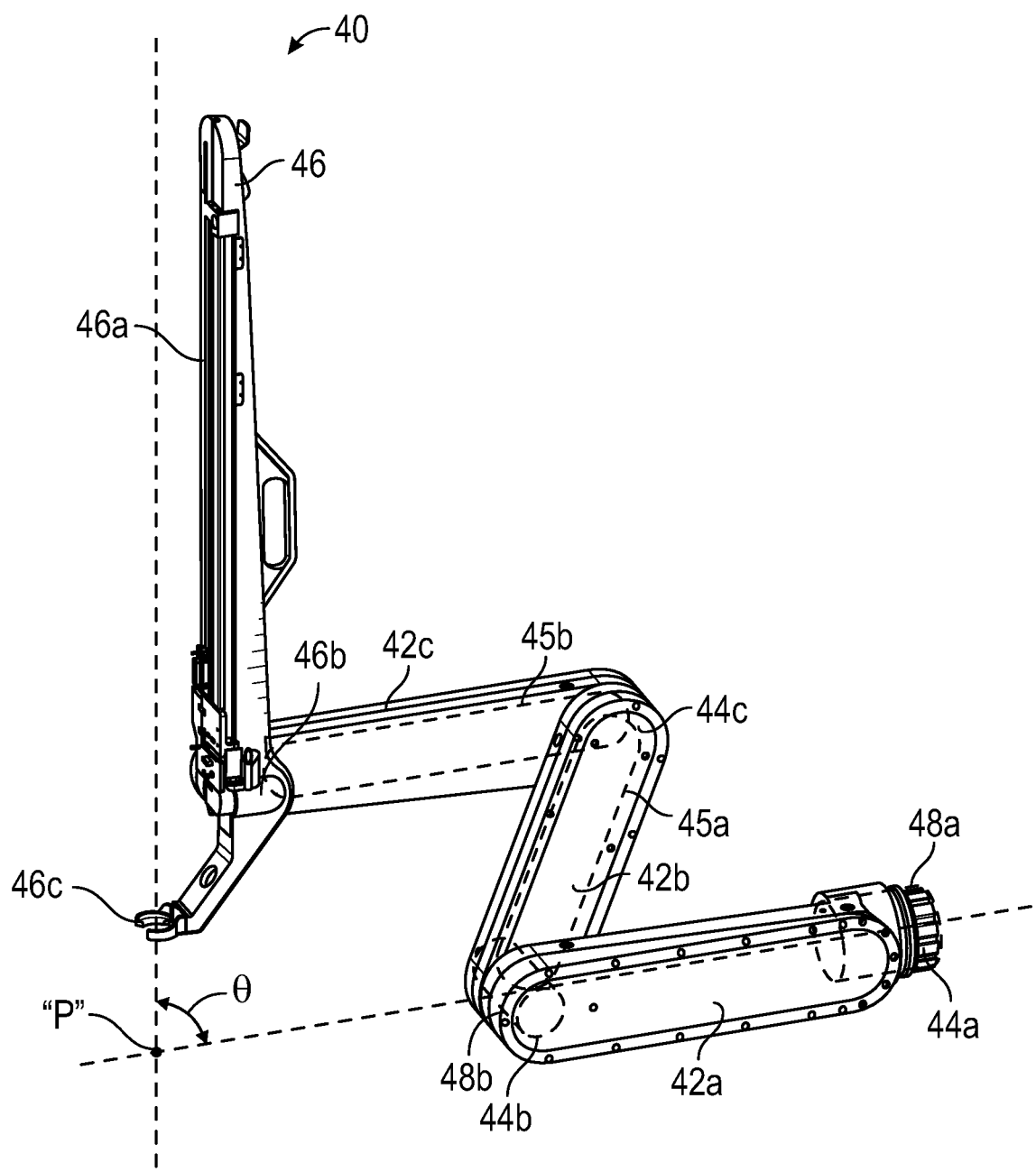
FIG. 2 is a perspective view of a surgical robotic arm of the surgical robotic system of FIG. 1 according to an embodiment of the present disclosure.
Figure 3:
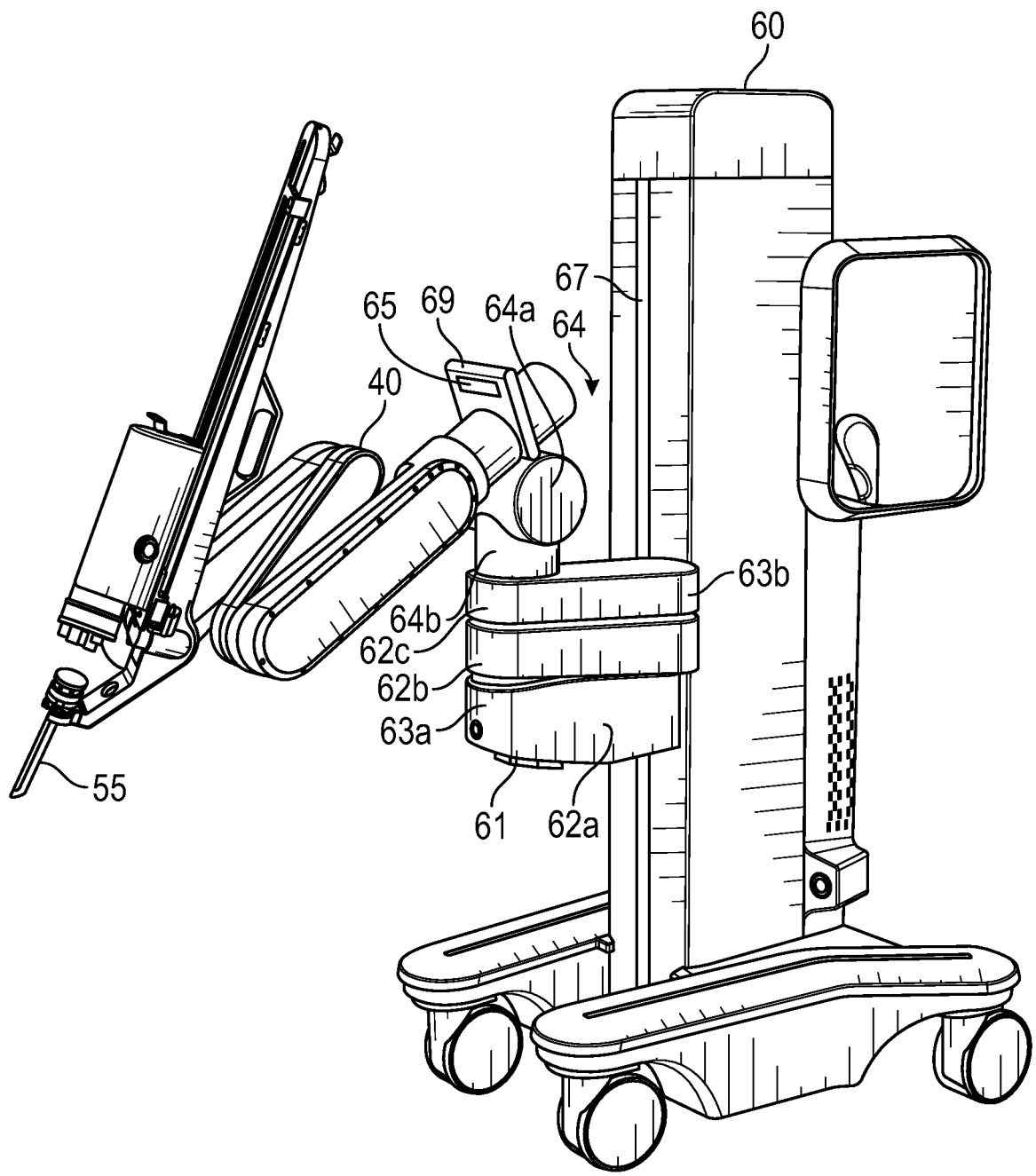
FIG. 3 is a perspective view of a movable cart having a setup arm with the surgical robotic arm of the surgical robotic system of FIG. 1 according to an embodiment of the present disclosure.

With reference to FIG. 2, each of the robotic arms 40 may include a plurality of links 42a, 42b, 42c, which are interconnected at joints 44a, 44b, 44c, respectively. Other configurations of links and joints may be utilized as known by those skilled in the art. The joint 44a is configured to secure the robotic arm 40 to the movable cart 60 and defines a first longitudinal axis. With reference to FIG. 3, the movable cart 60 includes a lift 67 and a setup arm 61, which provides a base for mounting of the robotic arm 40. The lift 67 allows for vertical movement of the setup arm 61. The movable cart 60 also includes a display 69 for displaying information pertaining to the robotic arm 40. In embodiments, the robotic arm 40 may include any type and/or number of joints.

The setup arm 61 includes a first link 62a, a second link 62b, and a third link 62c, which provide for lateral maneuverability of the robotic arm 40. The links 62a, 62b, 62c are interconnected at joints 63a and 63b, each of which may include an actuator (not shown) for rotating the links 62b and 62b relative to each other and the link 62c. In particular, the links 62a, 62b, 62c are movable in their corresponding lateral planes that are parallel to each other, thereby allowing for extension of the robotic arm 40 relative to the patient (e.g., surgical table). In embodiments, the robotic arm 40 may be coupled to the surgical table (not shown). The setup arm 61 includes controls 65 for adjusting movement of the links 62a, 62b, 62c as well as the lift 67. In embodiments, the setup arm 61 may include any type and/or number of joints.

The third link 62c may include a rotatable base 64 having two degrees of freedom. In particular, the rotatable base 64 includes a first actuator 64a and a second actuator 64b. The first actuator 64a is rotatable about a first stationary arm axis which is perpendicular to a plane defined by the third link 62c and the second actuator 64b is rotatable about a second stationary arm axis which is transverse to the first stationary arm axis. The first and second actuators 64a and 64b allow for full three-dimensional orientation of the robotic arm 40.

The actuator 48b of the joint 44b is coupled to the joint 44c via the belt 45a, and the joint 44c is in turn coupled to the joint 46b via the belt 45b. Joint 44c may include a transfer case coupling the belts 45a and 45b, such that the actuator 48b is configured to rotate each of the links 42b, 42c and a holder 46 relative to each other. More specifically, links 42b, 42c, and the holder 46 are passively coupled to the actuator 48b which enforces rotation about a pivot point "P" which lies at an intersection of the first axis defined by the link 42a and the second axis defined by the holder 46. In other words, the pivot point "P" is a remote center of motion (RCM) for the robotic arm 40. Thus, the actuator 48b controls the angle θ between the first and second axes allowing for orientation of the surgical instrument 50. Due to the interlinking of the links 42a, 42b, 42c, and the holder 46 via the belts 45a and 45b, the angles between the links 42a, 42b, 42c, and the holder 46 are also adjusted in order to achieve the desired angle θ. In embodiments, some or all of the joints 44a, 44b, 44c may include an actuator to obviate the need for mechanical linkages.

The joints 44a and 44b include an actuator 48a and 48b configured to drive the joints 44a, 44b, 44c relative to each other through a series of belts 45a and 45b or other mechanical linkages such as a drive rod, a cable, or a lever and the like. In particular, the actuator 48a is configured to rotate the robotic arm 40 about a longitudinal axis defined by the link 42a.

With reference to FIG. 2, the holder 46 defines a second longitudinal axis and is configured to receive an instrument drive unit (IDU) 52 (FIG. 1). The IDU 52 is configured to couple to an actuation mechanism of the surgical instrument 50 and the camera 51 and is configured to move (e.g., rotate) and actuate the instrument 50 and/or the camera 51. IDU 52 transfers actuation forces from its actuators to the surgical instrument 50 to actuate components an end effector 49 of the surgical instrument 50. The holder 46 includes a sliding mechanism 46a, which is configured to move the IDU 52 along the second longitudinal axis defined by the holder 46. The holder 46 also includes a joint 46b, which rotates the holder 46 relative to the link 42c. During endoscopic procedures, the instrument 50 may be inserted through an endoscopic access port 55 (FIG. 3) held by the holder 46. The holder 46 also includes a port latch 46c for securing the access port 55 to the holder 46 (FIG. 2).

The robotic arm 40 also includes a plurality of manual override buttons 53 (FIG. 1) disposed on the IDU 52 and the setup arm 61, which may be used in a manual mode. The user may press one or more of the buttons 53 to move the component associated with the button 53.

Figure 4:
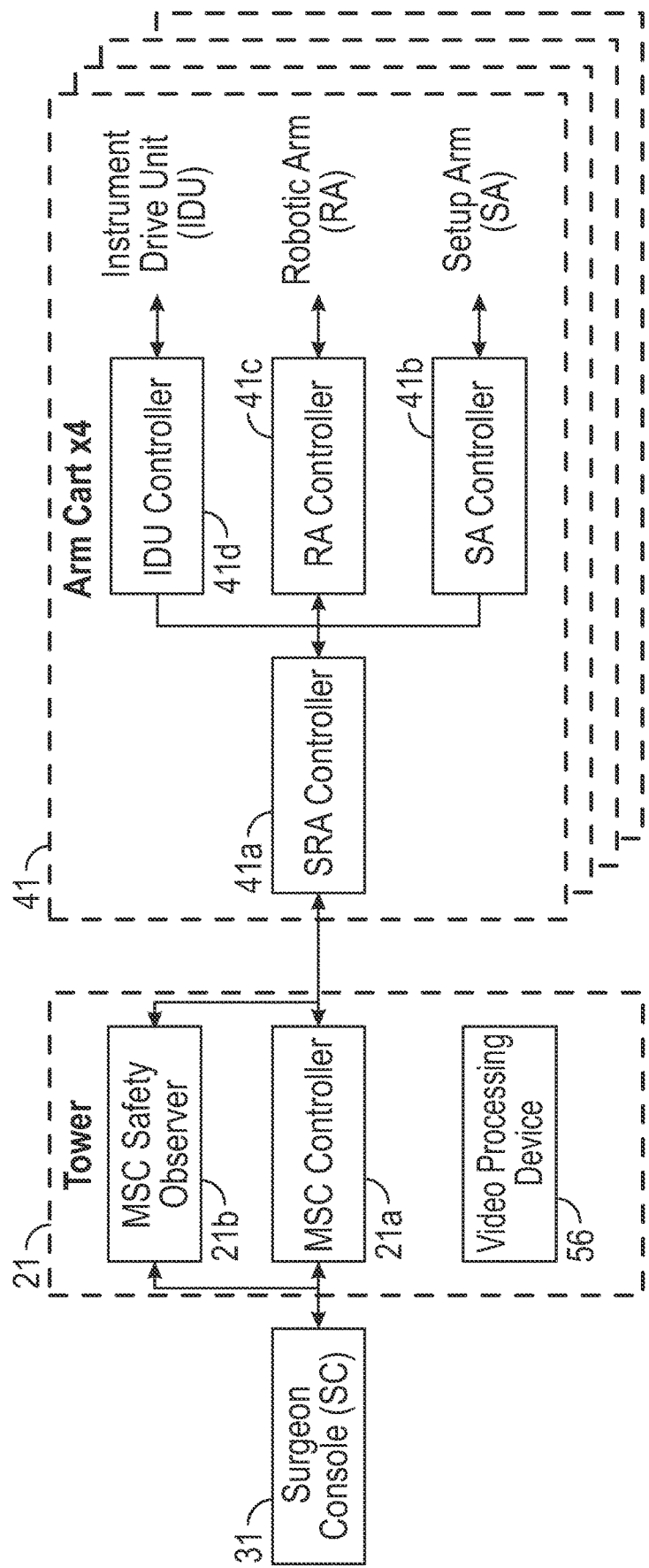
FIG. 4 is a schematic diagram of a computer architecture of the surgical robotic system of FIG. 1 according to an embodiment of the present disclosure.

With reference to FIG. 4, each of the computers 21, 31, 41 of the surgical robotic system 10 may include a plurality of controllers, which may be embodied in hardware and/or software. The computer 21 of the control tower 20 includes a controller 21a and safety observer 21b. The controller 21a receives data from the computer 31 of the surgeon console 30 about the current position and/or orientation of the handle controllers 38a and 38b and the state of the foot pedals 36 and other buttons. The controller 21a processes these input positions to determine desired drive commands for each joint of the robotic arm 40 and/or the IDU 52 and communicates these to the computer 41 of the robotic arm 40. The controller 21a also receives the actual joint angles measured by encoders of the actuators 48a and 48b and uses this information to determine force feedback commands that are transmitted back to the computer 31 of the surgeon console 30 to provide haptic feedback through the handle controllers 38a and 38b. The safety observer 21b performs validity checks on the data going into and out of the controller 21a and notifies a system fault handler if errors in the data transmission are detected to place the computer 21 and/or the surgical robotic system 10 into a safe state.

The computer 41 includes a plurality of controllers, namely, a main cart controller 41a, a setup arm controller 41b, a robotic arm controller 41c, and an instrument drive unit (IDU) controller 41d. The main cart controller 41a receives and processes joint commands from the controller 21a of the computer 21 and communicates them to the setup arm controller 41b, the robotic arm controller 41c, and the IDU controller 41d. The main cart controller 41a also manages instrument exchanges and the overall state of the movable cart 60, the robotic arm 40, and the IDU 52. The main cart controller 41a also communicates actual joint angles back to the controller 21a.

Each of joints 63a and 63b and the rotatable base 64 of the setup arm 61 are passive joints (i.e., no actuators are present therein) allowing for manual adjustment thereof by a user. The joints 63a and 63b and the rotatable base 64 include brakes that are disengaged by the user to configure the setup arm 61. The setup arm controller 41b monitors slippage of each of joints 63a and 63b and the rotatable base 64 of the setup arm 61, when brakes are engaged or can be freely moved by the operator when brakes are disengaged, but do not impact controls of other joints. The robotic arm controller 41c controls each joint 44a and 44b of the robotic arm 40 and calculates desired motor torques required for gravity compensation, friction compensation, and closed loop position control of the robotic arm 40. The robotic arm controller 41c calculates a movement command based on the calculated torque. The calculated motor commands are then communicated to one or more of the actuators 48a and 48b in the robotic arm 40. The actual joint positions are then transmitted by the actuators 48a and 48b back to the robotic arm controller 41c.

The IDU controller 41d receives desired joint angles for the surgical instrument 50, such as wrist and jaw angles, and computes desired currents for the motors in the IDU 52. The IDU controller 41d calculates actual angles based on the motor positions and transmits the actual angles back to the main cart controller 41a.

The robotic arm 40 is controlled in response to a pose of the handle controller controlling the robotic arm 40, e.g., the handle controller 38a, which is transformed into a desired pose of the robotic arm 40 through a hand eye transform function executed by the controller 21a. The hand eye function, as well as other functions described herein, is/are embodied in software executable by the controller 21a or any other suitable controller described herein. The pose of one of the handle controllers 38a may be embodied as a coordinate position and roll-pitch-yaw (RPY) orientation relative to a coordinate reference frame, which is fixed to the surgeon console 30. The desired pose of the instrument 50 is relative to a fixed frame on the robotic arm 40. The pose of the handle controller 38a is then scaled by a scaling function executed by the controller 21a. In embodiments, the coordinate position may be scaled down and the orientation may be scaled up by the scaling function. In addition, the controller 21a may also execute a clutching function, which disengages the handle controller 38a from the robotic arm 40. In particular, the controller 21a stops transmitting movement commands from the handle controller 38a to the robotic arm 40 if certain movement limits or other thresholds are exceeded and in essence acts like a virtual clutch mechanism, e.g., limits mechanical input from effecting mechanical output.

The desired pose of the robotic arm 40 is based on the pose of the handle controller 38a and is then passed by an inverse kinematics function executed by the controller 21a. The inverse kinematics function calculates angles for the joints 44a, 44b, 44c of the robotic arm 40 that achieve the scaled and adjusted pose input by the handle controller 38a. The calculated angles are then passed to the robotic arm controller 41c, which includes a joint axis controller having a proportional-derivative (PD) controller, the friction estimator module, the gravity compensator module, and a two-sided saturation block, which is configured to limit the commanded torque of the motors of the joints 44a, 44b, 44c.

Figure 5:
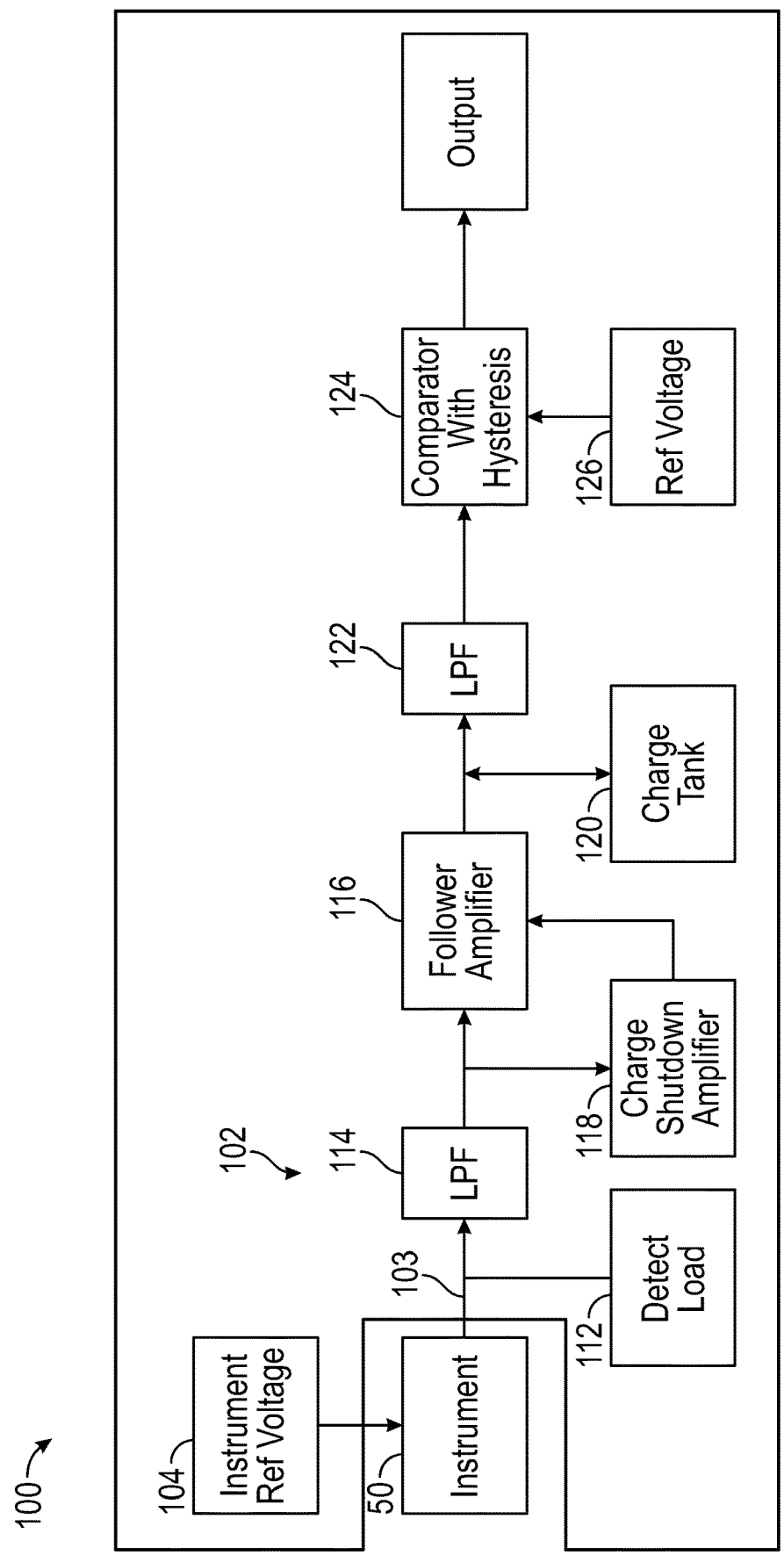
FIG. 5 is a schematic architecture of a system for determining connection status of an instrument according to an embodiment of the present disclosure.
Figure 6:
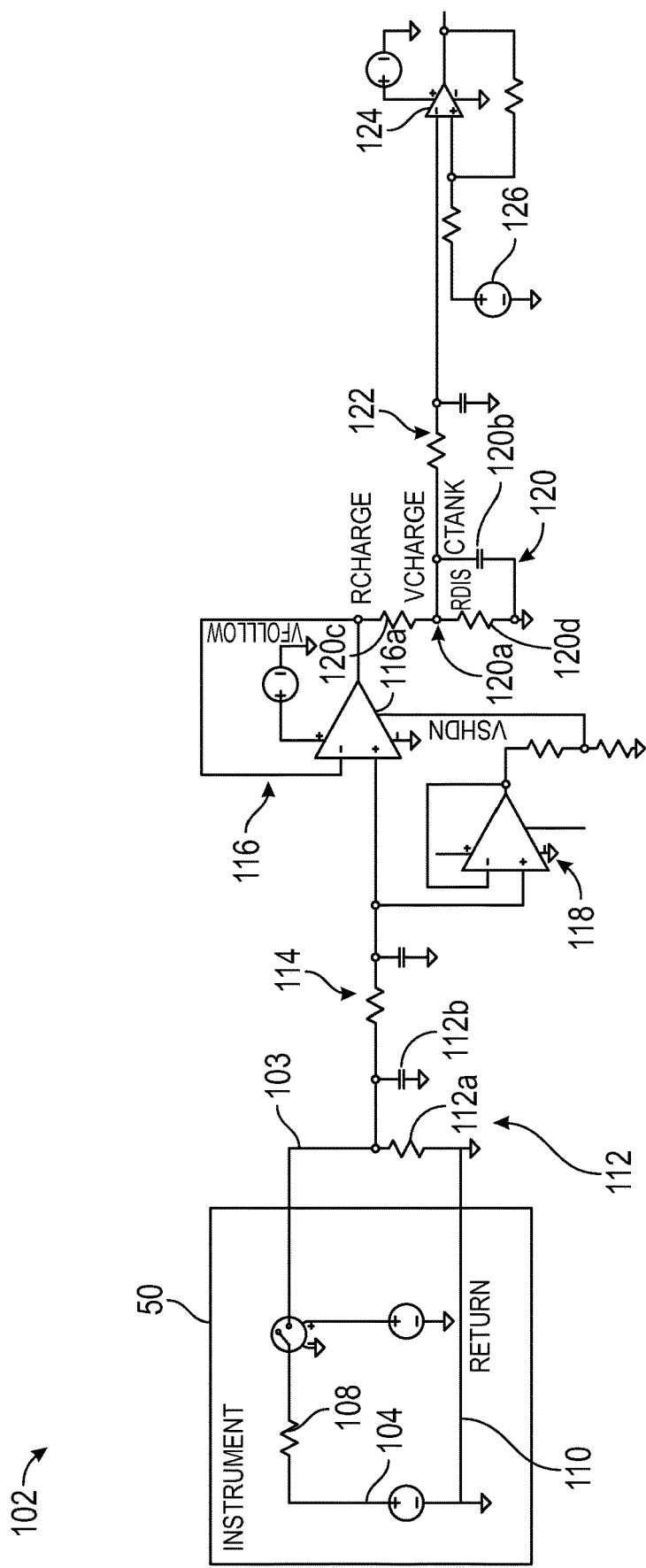
FIG. 6 is an electrical schematic of the system of FIG. 5.

With reference to FIGS. 5 and 6, a system 100 for determining connection status of the instrument 50 to the IDU 52 or any other powered surgical system 300 (FIG. 13). The IDU 52 includes a detection circuit 102 coupled to the instrument 50, which when coupled together form a load detect network 103. The detection circuit 102 includes a reference contact 104, which is a component of the IDU 52 along with a voltage source. The reference contact 104 is configured to supply an input (i.e., voltage) signal to the instrument 50, which then outputs an output signal (or value) based on the input signal through a resistor 108 disposed in the instrument 50. The detection circuit 102 also includes a detect load 112 having a detect load resistor 112a and an optional detect load capacitor 112b, which creates small delays in detection and minor filtering. The detect load 112 coupled in series with the instrument 50 and a return node 110 of the detection circuit 102, which is the node where the instrument 50 and the instrument load interface, i.e., load detect network 103 with an active circuit portion (i.e., after follower amplifier 116) performing the detection of connection/disconnection of the instrument 50. The return node 110 is common ground between the instrument 50 and the IDU 52 in the instrument 50 and ensures that both parts are at the same reference.

The resistor divider of the resistor 108 (i.e., resistor 108 and the detect load resistor 112a) sets the voltage at the load detect network 103. This voltage is selected to meet appropriate voltage thresholds of a follower amplifier 116 and a charge shutdown amplifier 118. The detect load capacitor 112b is used to make minor adjustments to the rise and fall times of the voltage at the load detect network 103. These changes will have minor impacts to the overall circuit response time of the overall embodiment.

Upon attachment of the instrument 50, the detect load capacitor 112b begins charging to a value of instrument reference signal multiplied by the detect load resistor 112a and the product of which divided by the combined resistances of the detect load resistor 112a and the resistor 108. Upon detachment of the instrument 50, the detect load capacitor 112b will discharge through the detect load resistor 112a as the resistor 108 is no longer present in the circuit. The detect load capacitor 112b is used to add and modify the first stage in connection/disconnection delay. If the detect load capacitor 112b is not populated, the response at return node 110 will be nearly instantaneous (i.e., ignoring parasitic capacitances in a physical circuit).

The detection circuit 102 further includes an optional first low-pass filter 114, which may be passive. The first low-pass filter 114 is configured to block unwanted high-frequency voltage signals and is coupled to the follower amplifier 116 and the charge shutdown amplifier 118. The follower amplifier 116 acts as a voltage buffer between the load (i.e., resistor 112a) and the next circuit stage of the detection circuit 102. The follower amplifier 116 also includes a shutdown contact 116a configured to place the amplifier output in a high-impedance state. The shutdown contact 116a is coupled to the charge shutdown amplifier 118 and is configured to detect the presence of the instrument 50 (i.e., resistor 112a) and to create a shutdown signal to the follower amplifier 116 when the instrument 50 is no longer detected as part of the load detect network 103.

The detection circuit 102 additionally includes a charge tank 120, which includes a resistive divider 120a having a first tank resistor 120c and a second tank resistor 120d, and a tank capacitor 120b having a relatively large capacitance, e.g., from about 2 µF to about 4 µF. Capacitance may be selected using the desired charge time (output turn-on/delay) and the desired discharge time (output turn-off time) delay. The charge tank 120 is coupled to the follower amplifier 116 via the first tank resistor 120c, which has a relatively low resistance compared to the second tank resistor 120d, e.g., from about 0.5 kΩ to about 2 kΩ, to allow for fast charging of the tank capacitor 120b. In embodiments, the ratio of resistances between the resistance of the second tank resistor 120d to the resistance of the first tank resistor 120c may be about 3 or above. The charge tank 120 includes the second tank resistor 120d, which has a relatively large resistance, i.e., larger than that of the first tank resistor 120c and may be from about 200 kΩ to about 600 kΩ The large resistance of the second tank resistor 120d provides a slow decay of the output between the tank capacitor 120b and the second tank resistor 120d. The charge tank 120 modifies the signal from the follower amplifier 116 and outputs a charged signal.

The first tank resistor 120c is effectively removed from the circuit when the charge shutdown amplifier 118 disables the follower amplifier 116 allowing current to flow only from the tank capacitor 120b to return through resistor 120d. The discharge timing may be calculated from the RC time constant of the second tank resistor 120d and the tank capacitor 120b and the standard capacitor discharge equation. Similarly, the charge time may be calculated using the capacitor charge equation and the values of the tank capacitor 120b, the first tank resistor 120c, and the second tank resistor 120d. Simplified, the first tank resistor 120c is dominant during charging given the large ratio between the second tank resistor 120d and the first tank resistor 120c.

The resistive divider 120a establishes the charging voltage. The divider value can be calculated based on the resistances of first tank resistor 120c and a second tank resistor 120d. The divider value is insignificant (but still determines the maximum charge voltage of resistive divider 120a) because first tank resistor 120c is much greater than second tank resistor 120d. The importance of these values is the charge and discharge rates.

Tank capacitor 120b charges through the first tank resistor 120c when follower amplifier 116 is enabled. The RC value of first tank resistor 120c and the tank capacitor 120b determine the rate of charge. A lower RC provides for a faster charging time which minimizes the delay to recognizing a valid connection.

Tank capacitor 120b discharges through second tank resistor 120d when follower amplifier 116 is disabled as disabling the follower amplifier 116 provides no current path through the first tank resistor 120c. The second tank resistor 120d is the only path for current to flow out of tank capacitor 120b when follower amplifier 116 is disabled. The RC value of second tank resistor 120d and the tank capacitor 120b determines the rate of discharge. A higher RC provides for a slower discharging time which increases the delay to rerelease detection of a valid connection.

Tank capacitor 120b discharges through second tank resistor 120d when follower amplifier 116 is disabled. Disabling amplifier 116 provides no current path through the first tank resistor 120c and the second tank resistor 120d is the only path for current to flow out of 120b. The RC value of second tank resistor 120d and the tank capacitor 120b determines the rate of discharge. A higher RC provides for a slower discharging time which increases the delay to rerelease detection of a valid connection.

The analog value of the charge tank 120 at the resistive divider 120a is converted to a digital signal using comparator 124 and reference voltage 126, both of which are outside of charge tank 120. A second optional low pass filter 122, which may be passive, filters the output supplied to a comparator 124 from charge tank 120 at the resistive divider 120a. Comparator 124 may provide optional voltage level hysteresis processing. The comparator 124 also receives a reference (i.e., voltage) signal from a reference source 126, which outputs the reference signal which provides a center trip point for triggering the comparator 124. The trip value depends on the design of the hysteresis of the comparator 124. Hysteresis thresholds are set with the resistors in the positive feedback path of 124. The comparator 124 compares the charged signal from the charge tank 120 and the reference signal from the reference source 126. Voltage hysteresis allows for noise reduction so that low-high and high-low transitions have adjusted trip points based on the current state of the amplifier. The values of the hysteresis thresholds may be selected in view that hysteresis will add a delay to the turn on and turn off times of the output signal. The comparator 124 outputs the detection signal to the IDU controller 41d and/or any other controller of the system 10 indicating the status of the connection of the instrument 50 based on a hysteresis enabled comparison of the charged signal and the reference signal.

When the instrument 50 is connected to the detection circuit 102 a positive voltage signal is created between the instrument 50 and the detect load resistor 112a by the input signal. The positive voltage signal is simultaneously passed to the follower amplifier 116 and the charge shutdown amplifier 118. The voltage signal is buffered by the charge shutdown amplifier 118, which outputs a positive voltage (i.e., activation signal) and enables the follower amplifier 116, which then passes the voltage between the instrument 50 and the load detect network 103 forward to the charge tank 120. The tank capacitor 120b begins to rapidly charge through the smaller, first tank resistor 120c. Once the voltage of the charge tank 120 passes the "turn on" threshold of the comparator 124, the comparator 124 outputs a first output signal indicating connection (i.e., presence) of the instrument 50.

When the instrument 50 is disconnected from the detection circuit 102 there is zero voltage between the instrument 50 and the detect load resistor 112a. The voltage simultaneously drops to zero at the follower amplifier 116 and the charge shutdown amplifier 118. The voltage buffered by the charge shutdown amplifier 118 drops to zero as well and disables the follower amplifier 116. The follower amplifier 116 is placed in a high impedance state relative to the charge tank 120, as a result of which there is no current flow in or out of the follower amplifier 116. The tank capacitor 120b in the charge tank 120 begins to slowly discharge through the larger second tank resistor 120d. Once the voltage of the charge tank 120 passes the "turn off" threshold of the comparator 124, the comparator 124 outputs a second output signal indicating disconnection of the instrument 50.

The interconnection of the tank capacitor 120b with either the smaller, first tank resistor 120c or the larger, second tank resistor 120d enables an asymmetric-in-time hysteresis response of the detection circuit 102. This is due to the tank capacitor 120 charging more rapidly than discharging, which in turn allows for detection of the connection of the instrument 50 during a first interval (i.e., charging interval), e.g., from about 0.05 seconds to about 0.2 seconds. Conversely, disconnection is detected at a slower rate, namely, after a second interval (i.e., discharging interval) that is longer than the first interval. The second interval may be from about 0.5 seconds to about 2 seconds.

The connection and disconnection output signals generated by the detection circuit 102 may be provided to one or more controllers 21a, 41a, etc. of the system 10, which may then output the connection status of the instrument 50 on one of the displays 23, 32, 34.

Figure 7:
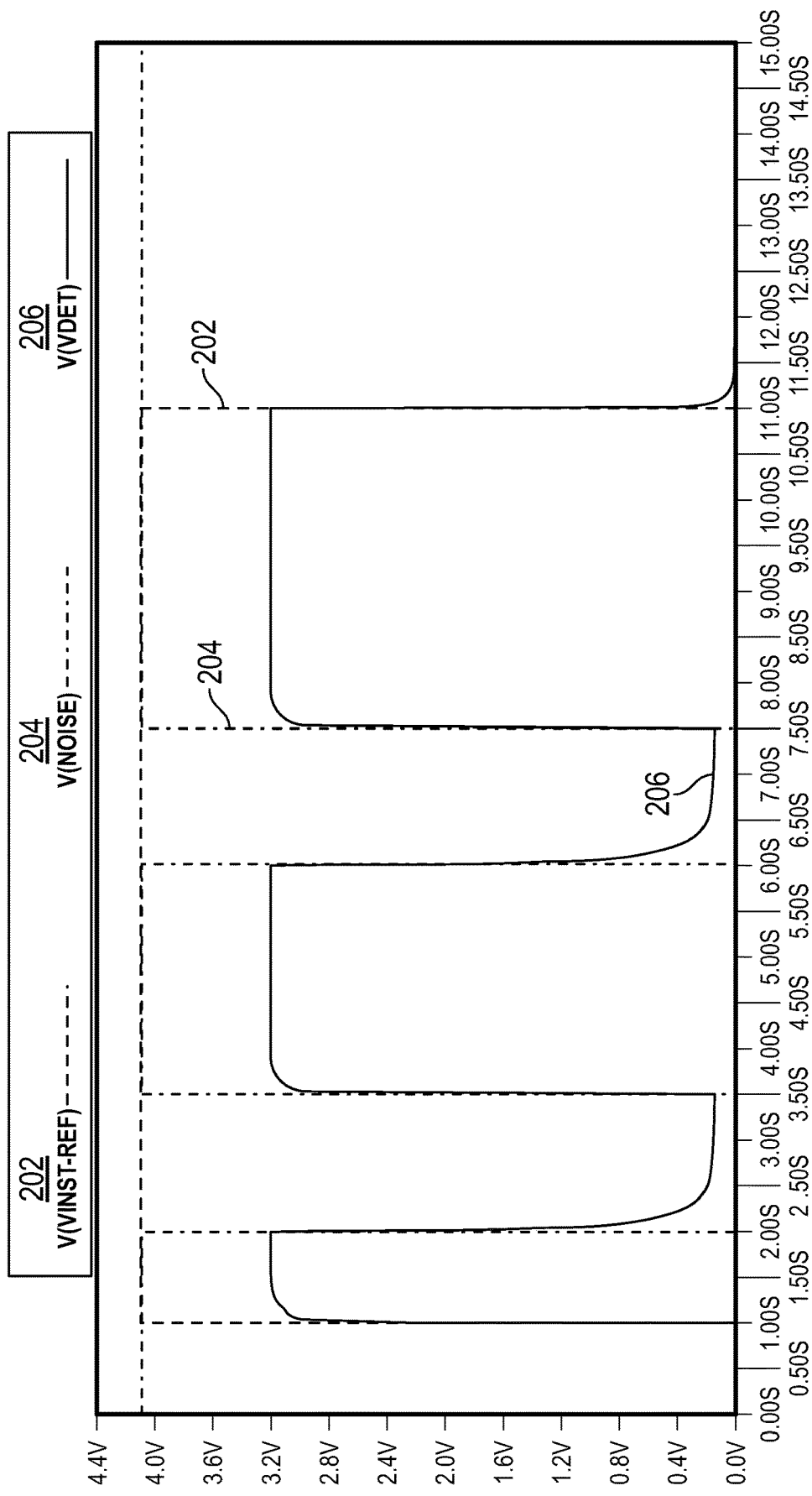
FIGS. 7-11 are plot of signals representing connection status of the instrument according to an embodiment of the present disclosure.

FIG. 7 shows plots of signals of the detection circuit 102, namely, a plot 202 of actual connection status (i.e. representative of the voltage if there were no false disconnection due to noise or poor mechanical contact) of the instrument 50 to the IDU 52, which occurs from approximately 1 second to about 11 seconds, at which disconnection of the instrument 50 to the IDU 52 occurs. Plot 204 shows simulated false disconnects, each about 1.5 seconds occurring at about 2 seconds and 6 seconds. Plot 206 shows a connection signal where the instrument 50 connects to the detection circuit 102, i.e., the voltage at load detect network 103. The plots 204 and 206 are combined (i.e., as a logical AND) to create the connection signal as provided to the load detect network 103. Plot 206 represents the voltage at load detect network 103, which is the value at the detect load 112 when interrupted by simulated disconnection signal plot 204. Essentially, 204 creates an interruption to 202. Plots 202-206 show that false disconnects were not triggering the connection signal output by the detection circuit 102 up to a preset threshold of the voltage at return node 110. The thresholds are determined by parameters set in the follower amplifier 116, the charge shutdown amplifier 118, and the charge tank 120 Once exceeded, the rest of the circuitry of the detection circuit 102 determines the output signal.

Figure 8:
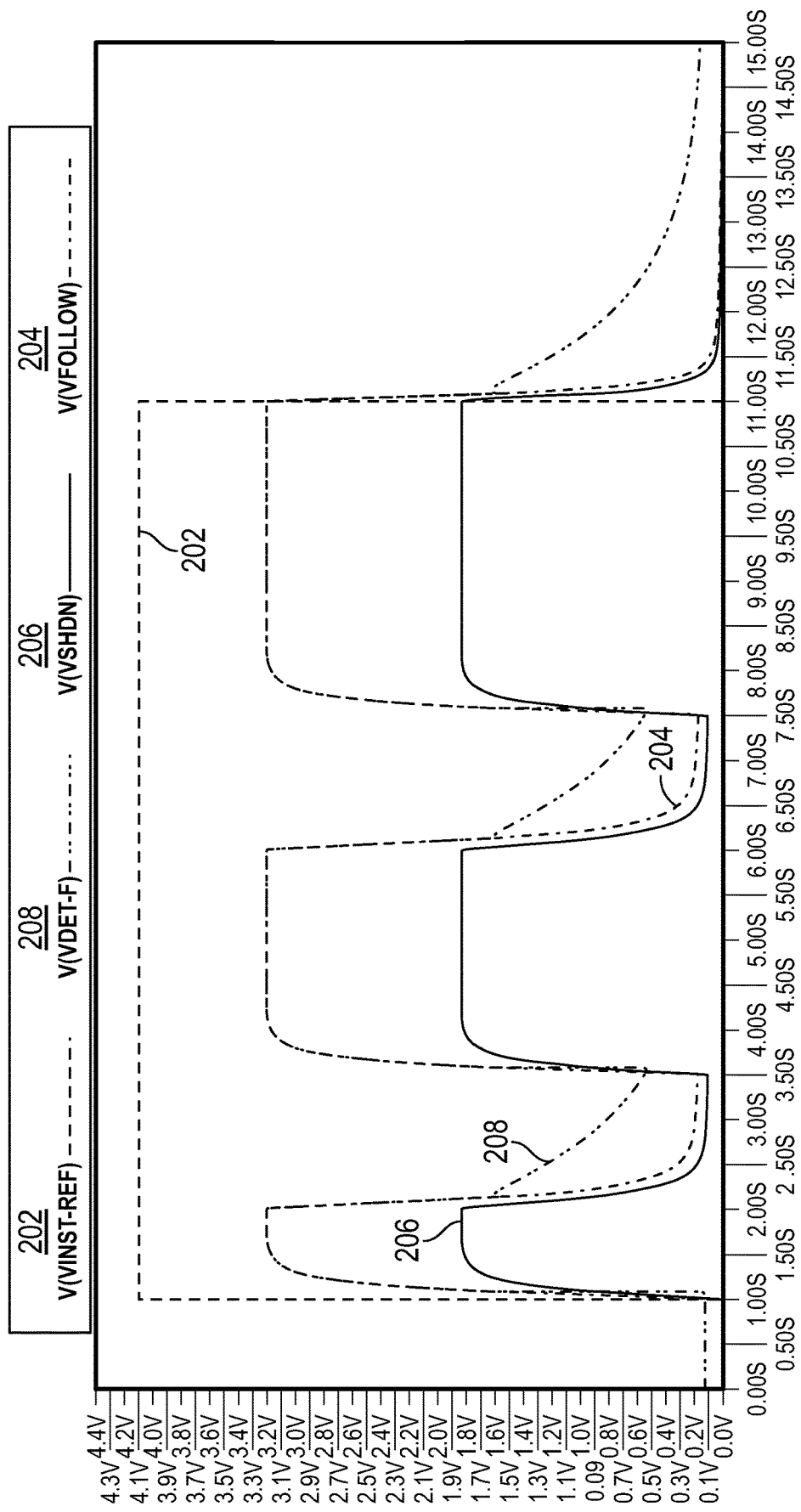

FIG. 8 shows functionality of the shutdown contact 116a of the follower amplifier 116 as well as the voltage applied to the charge tank 120 based on the connection of the instrument 50 and introduced noise. The plot 202 shows a connection status of the instrument 50 to the IDU 52 (i.e., ideal connection status before noise/disconnection is introduced), the plot 206 shows the shutdown signal to the follower amplifier 116 (i.e., shutdown is active low, so follower amplifier 116 is disabled while at low voltages). Plot 208 shows voltage after the load detect network 103 and the first low-pass filter 114 including introduced disconnects. Plot 204 is representative of the output of the follower amplifier 116, which shows that the output charges quickly when the instrument 50 is detected and discharges slowly when the follower amplifier 116 is disabled by the shutdown contact 116a.

Figure 9:
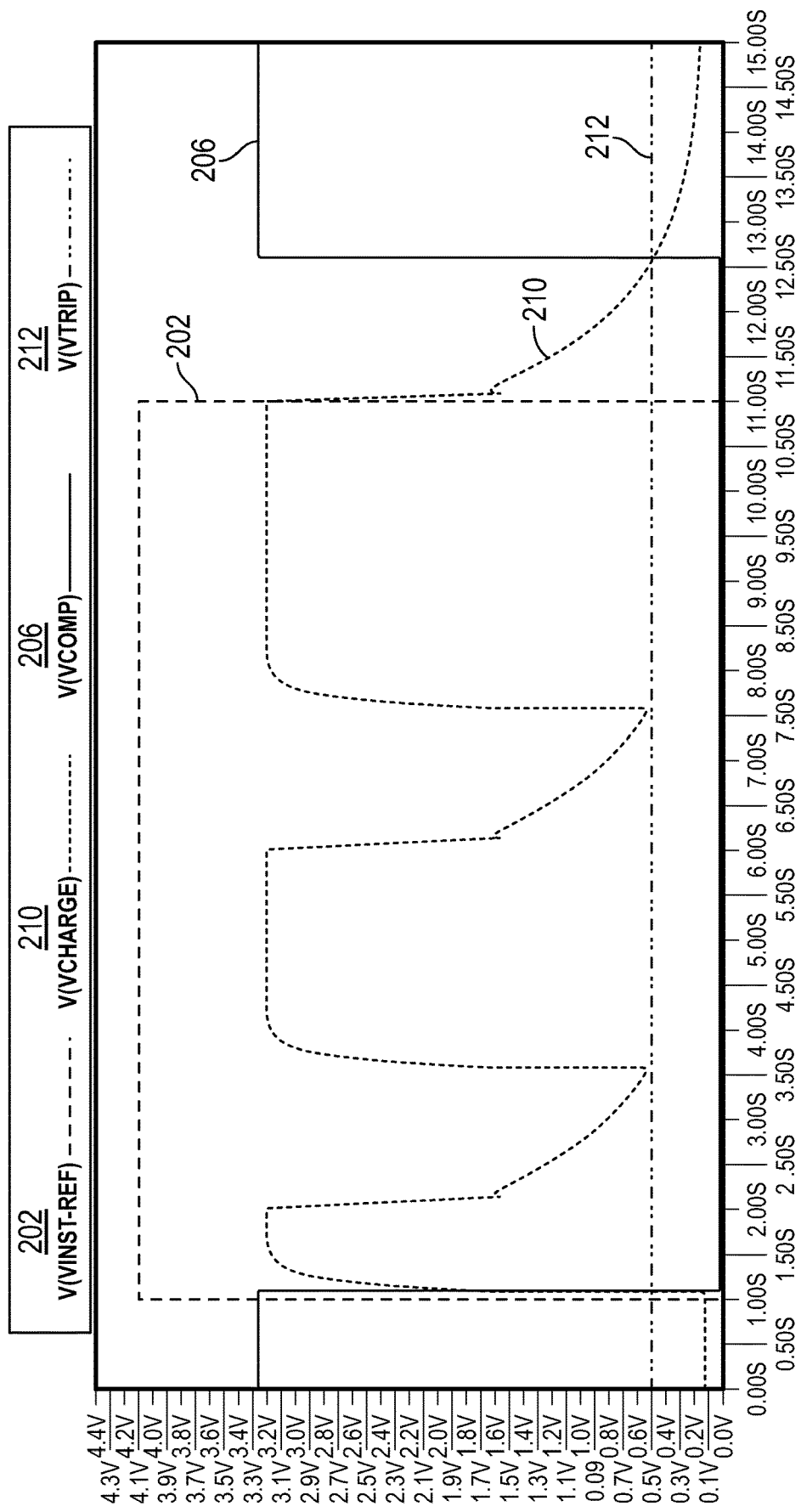

FIG. 8 only shows the buffered value of the filtered signal at the detection load 112. Charge and discharge rate are shown in FIG. 9, which shows the output of the comparator 124 relative to the output of the charge tank 120 and the input instrument signal with noise is included, but not plotted. Input plot 210 shows the charge tank 120 at the resistive divider 120a, charging and discharging in response to the variations caused by the unshown noise input. This plot also shows that the value (voltage) at the resistive divider 120a charges rapidly (e.g., a quick rise on 210) and discharges slowly once amplifier 116 is disabled (e.g., a slow decay on 210). In particular, it can be seen that the output of the comparator will not trigger a disconnect, shown as plot 206, until the output of the charge tank 120, shown as plot 210, falls below the threshold of the comparator 124, shown as plot 212.

Figure 10:
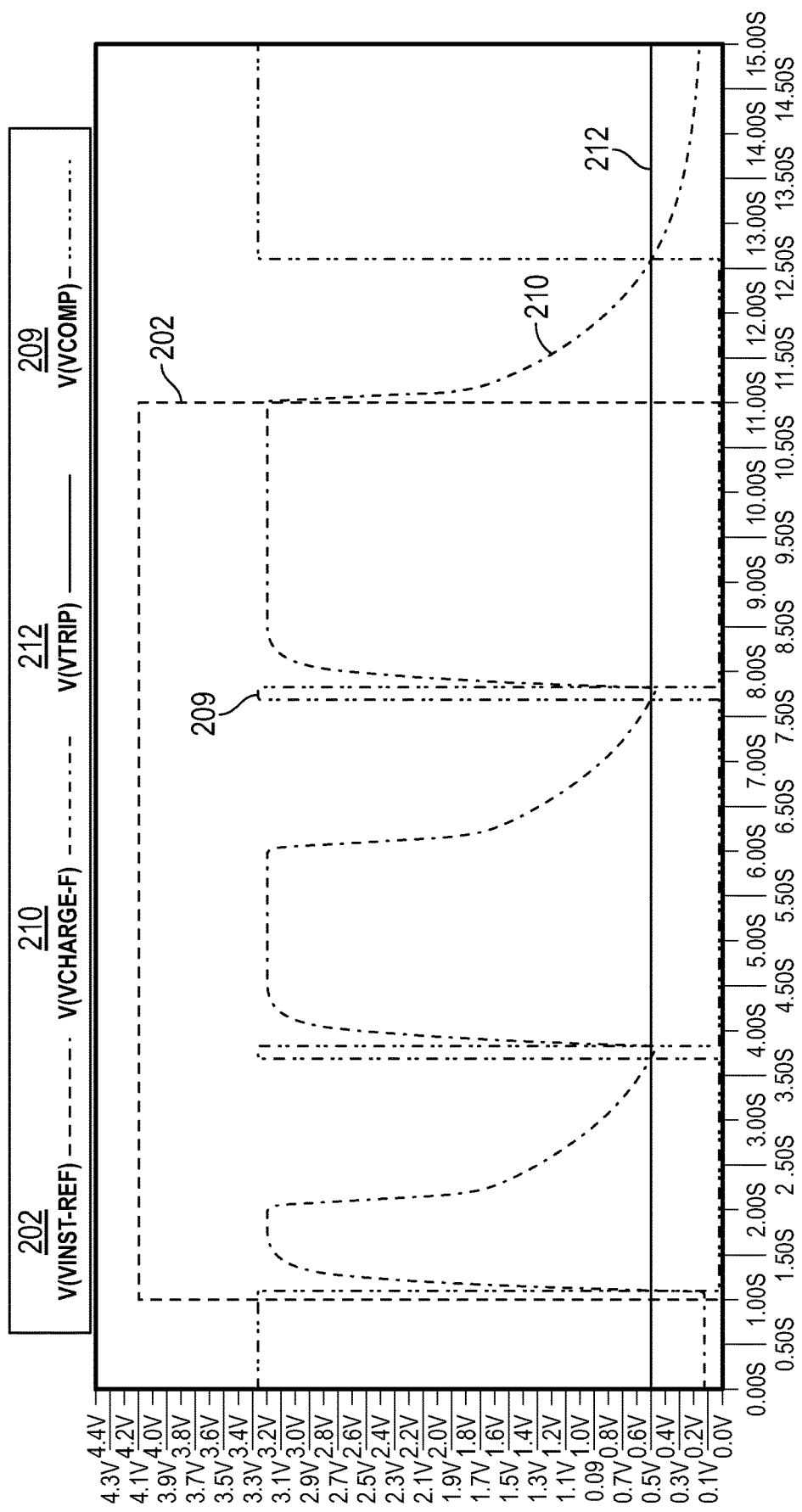

FIG. 10 shows the effects of increased disconnect time due to noise of about 1.75 seconds (i.e., outside of intended tolerable disconnect of about 1.5 seconds in this example), output of comparator 124 is shown as plot 209. In particular, low output indicates a connection and a high output indicates a disconnection. It can be seen that the output of the charge tank 120, shown as plot 210, falls below the trip threshold of the comparator 124, shown as plot 212, which triggers a disconnect signal to the processor (e.g., to one or more controllers 21a, 41a of the system 10) in these incidents. In embodiments, various controllers of the system 10 may implement software filters to provide additional filtering and reject certain types of disconnect signals.

Figure 11:
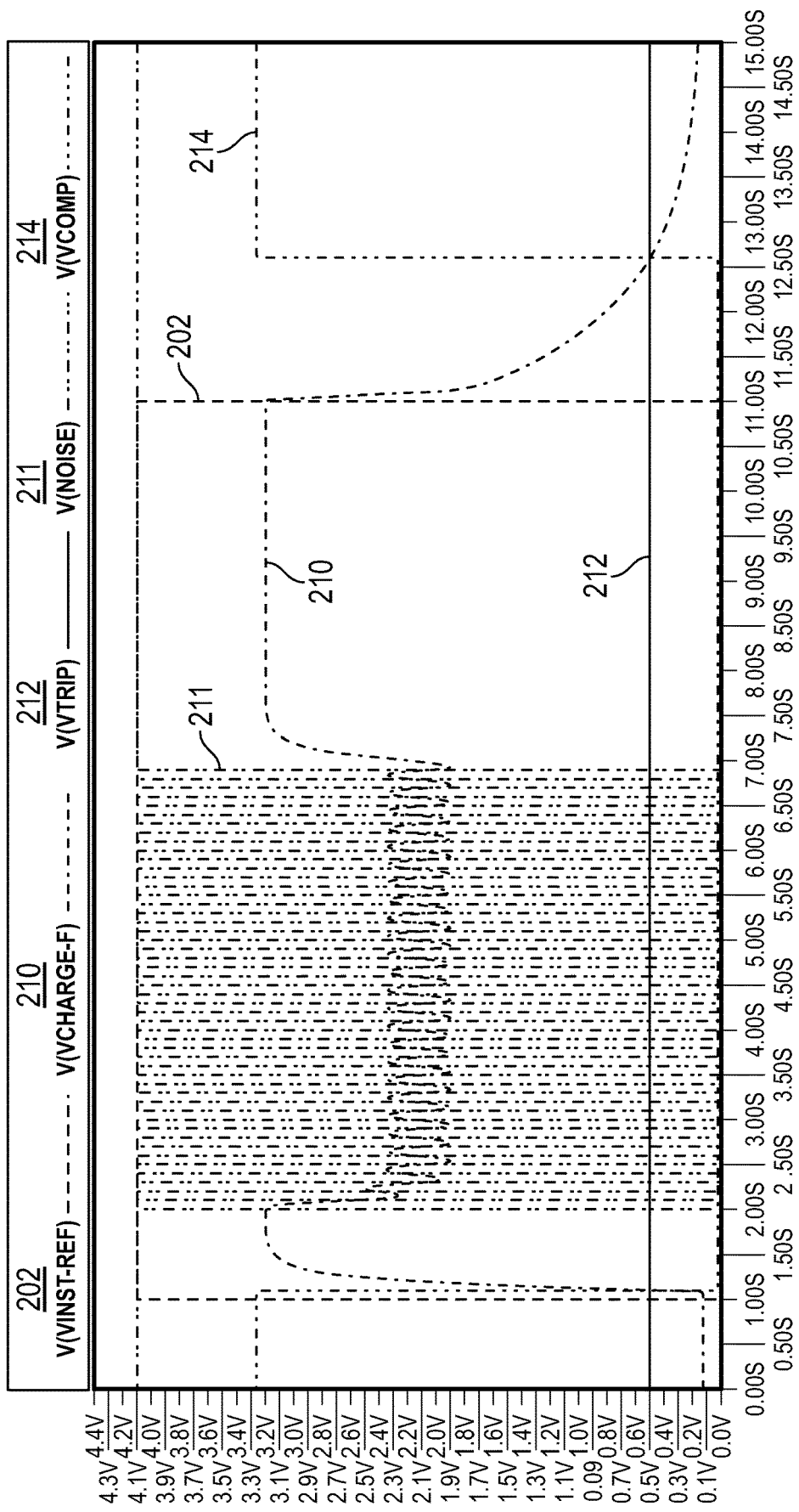

FIG. 11 shows effects of a jittery disconnection (i.e., multiple short disconnections in rapid succession) that may be caused by an external disturbance such as a vibration, which includes a plurality of on/off cycles, e.g., 25 cycles each on and off period being about 100 ms shown as plot 211. Instrument connection status without noise is shown in plot 202. It can be seen here that the value of the charge tank 120 at resistive divider 120a, i.e., plot 210, never approaches the trip threshold of the comparator 124, i.e., plot 212, and the value at the charge tank 120 replenishes from the applied voltage at the output of the follower amplifier 116 without tripping a disconnection signal shown as plot 214.

Figure 12:
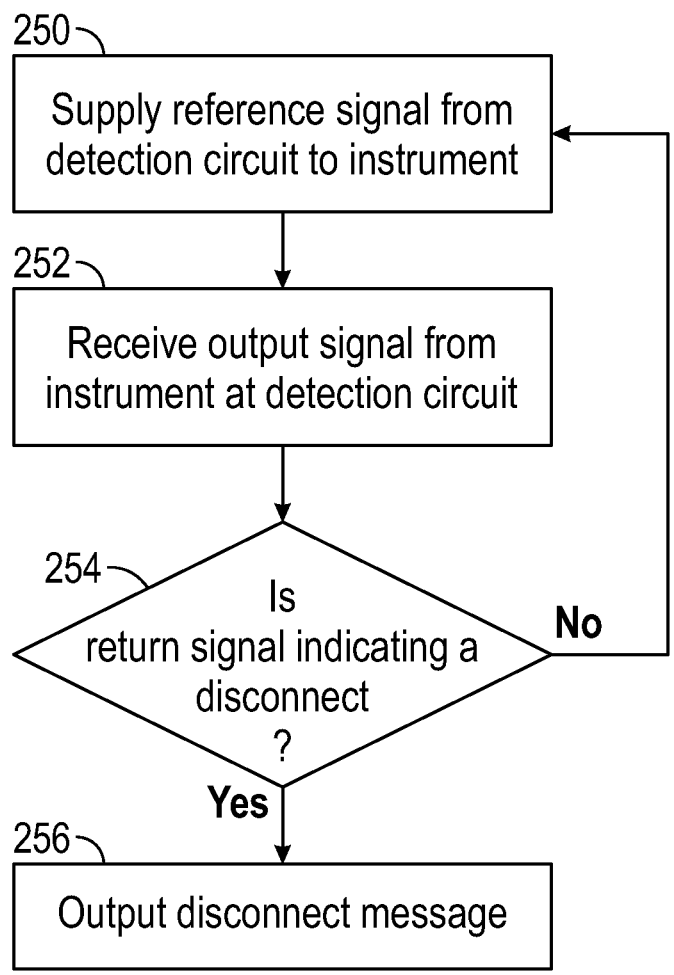
FIG. 12 is a flow chart for a method for determining connection status of an instrument according to an embodiment of the present disclosure.

With reference to FIG. 12 a method of determining connection status of the instrument 50 to a powered surgical system, e.g., system 10, includes supplying an input signal through the detection circuit 102 to the instrument 50 at step 250, as described above with respect to FIGS. 5 and 6. The detection circuit 102 outputs the output signal at step 252 after the input signal passes through the instrument and the components of the detection circuit 102. The output signal is provided to a processor (e.g., to one or more controllers 21a, 41a, 41d of the system 10) at step 254, which determines whether the output signal is indicative of a connection or disconnection of the instrument 50. If the signal is indicating a connection is active, the method returns to step 250. Conversely, if the determination by the processor is that the instrument 50 is disconnected, the processor outputs a disconnect message on one of the displays 23, 32, 34 at step 256. In embodiments, the processor may also put one or more of the components of the system 10, e.g., surgeon console 30, the robotic arm 40, the IDU 52 into an emergency mode where the instrument 50 is no longer controlled by teleoperation allowing for manual intervention by the surgical staff to confirm the connection status of the instrument 50.

The detection circuit 102 implements asymmetric-in-time hysteresis for the detection of the connection of the instrument 50 to the IDU 52 of the robotic surgical system 10 or any other powered surgical system, such as one shown in FIG. 13. The above implementation may be modified (i.e., changing capacitance and resistance of passive components) to achieve different connection and disconnection detection times.

With reference to FIG. 13, another embodiment of a powered surgical system 300 includes a powered surgical handle 302, which includes similar components as the IDU 52, e.g., one or more motors, controllers, memory storing instructions, etc. The instrument 50 may be used with a powered surgical handle 302, which is configured as a powered surgical handle including a housing having motors, controllers, display, and other components described above disposed within the housing. The powered surgical handle 302 is configured to detect the connection status of the instrument 50 in the same manner as described above with respect to the system 10.

Additional embodiments and uses of the detection circuit 102 are also envisioned. In one embodiments, the input-to-output transition behavior may be reversed as described above, where the delay times and/or thresholds are swapped, such that where the input is valid longer before an inactive-to-active transition is made and the active-to-inactive response time is shorter than the input.

While the detection circuit 102 was described with various analog components, which obviates the need to use additional software resources to the application that controls the majority of the electronics in the IDU 52. These components may be replaced with digital components while offloading the processing requirements from the IDU controller 41d. In one embodiment, a dedicated microcontroller in line with software on board an algorithm could be made that only monitors the input signal, recreates the same time base hysteresis and provides the same output signal to the IDU controller 41d or any other controller or processor of the system 10 that the analog detection circuit 102 provides.

Similarly, the same algorithm may be created in programmable logic that monitors the input signal, recreates the same time base hysteresis and provides the same output signal to the main processor that the analog circuit provides. Advantages over a dedicated microcontroller is that programmable logic is more deterministic and finer resolutions in timing are possible, than with a generic microcontroller/microprocessor.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

What is claimed is:

1. A powered surgical system comprising:
an instrument drive unit;
an instrument configured to couple to the instrument drive unit; and
a detection circuit configured to supply an input signal to the instrument and to output, in an asymmetric-in-time hysteresis-in-time manner, an output signal having a first value indicating a connection of the instrument or a second value indicating a disconnection of the instrument, wherein the connection of the instrument is detected within a first interval and the disconnection of the instrument is detected after expiration of a second interval that is longer than the first interval.

2. The powered surgical system according to claim 1, further comprising:
a processor configured to determine a connection status of the instrument based on receipt of the output signal.

3. The powered surgical system according to claim 2, further comprising:
a display, wherein the processor is configured to output the connection status on the display.

4. The powered surgical system according to claim 1, wherein the detection circuit includes:
a connection configured to couple to the instrument; and
a follower amplifier coupled to the connection and configured to buffer an instrument signal received from the connection.

5. The powered surgical system according to claim 4, wherein the detection circuit further includes:
a charge shutdown amplifier coupled to the follower amplifier, wherein the charge shutdown amplifier is configured to supply an activation signal to the follower amplifier in response to the instrument signal being positive, wherein the activation signal enables the follower amplifier.

6. The powered surgical system according to claim 5, wherein the charge shutdown amplifier is further configured to supply a shutdown signal to the follower amplifier in response to the instrument signal being zero, wherein the shutdown signal disables the follower amplifier.

7. The powered surgical system according to claim 6, wherein the detection circuit further includes:
a charge tank including:
a resistor divider having first resistor having a first resistance, a second resistor having a second resistance larger than the first resistance; and
a tank capacitor, wherein the charge tank is configured to output a charge signal based on a charge of the tank capacitor.

8. The powered surgical system according to claim 7, wherein the tank capacitor is configured to charge during a charging interval when the follower amplifier is enabled and to discharge during a discharging interval when the follower amplifier is disabled.

9. The powered surgical system according to claim 8, wherein the discharging interval corresponds to the second interval and is longer than the charging interval, which corresponds to the first interval.

10. The powered surgical system according to claim 8, wherein the detection circuit further includes:
a comparator coupled to the charge tank, the comparator configured to output the output signal based on a comparison of the charged signal to a reference signal.

11. The powered surgical system according to claim 1, further comprising:
a robotic arm including the instrument drive unit.

12. The powered surgical system according to claim 1, wherein the instrument drive unit is a powered surgical handle.

13. An instrument connection detection circuit comprising:
an input signal source configured to supply an input signal to an instrument coupled to an instrument drive unit; and
a comparator to output, in an asymmetric-in-time hysteresis manner, one of a first value indicating a connection of the instrument or a second value indicating a disconnection of the instrument, wherein the connection of the instrument is detected within a first interval and the disconnection of the instrument is detected after expiration of a second interval that is longer than the first interval.

14. The instrument connection detection circuit according to claim 13, further comprising:
a follower amplifier coupled to the connection and configured to buffer an instrument signal received from the connection.

15. The instrument connection detection circuit according to claim 14, further comprising:
a charge shutdown amplifier coupled to the follower amplifier, wherein the charge shutdown amplifier is configured to supply an activation signal to the follower amplifier in response to the instrument signal being positive, the activation signal enabling the follower amplifier, and further wherein the charge shutdown amplifier is further configured to supply a shutdown signal to the follower amplifier in response to the instrument signal being zero, the shutdown signal disabling the follower amplifier.

16. The instrument connection detection circuit according to claim 15, further comprising:
a charge tank including:
a resistor divider having first resistor having a first resistance, a second resistor having a second resistance larger than the first resistance; and
a tank capacitor, wherein the charge tank is configured to output a charge signal based on a charge of the tank capacitor.

17. The instrument connection detection circuit according to claim 16, wherein the tank capacitor is configured to charge during a charging interval when the follower amplifier is enabled and to discharge during a discharging interval when the follower amplifier is disabled.

18. The instrument connection detection circuit according to claim 17, wherein the discharging interval corresponds to the second interval and is longer than the charging interval, which corresponds to the first interval.

19. A method for determining a connection status of an instrument, the method comprising:
supplying an input signal from a detection circuit to an instrument coupled to an instrument drive unit;
outputting, in an asymmetric-in-time hysteresis manner, an output signal including one of a first value indicating a connection of the instrument or a second value indicating a disconnection of the instrument, wherein the connection of the instrument is detected within a first interval and the disconnection of the instrument is detected after expiration of a second interval that is longer than the first interval;
providing one of the first value or the second value to a processor; and
outputting a connection status message based on receipt of the output signal.

20. The method according to claim 19, wherein the instrument drive unit is at least one of a robotic arm or a powered surgical handheld instrument.

* * * * *